United States Patent
Lumpkin et al.

(10) Patent No.: US 6,425,464 B2
(45) Date of Patent: Jul. 30, 2002

(54) FRICTION PAD ASSEMBLY FOR A DISC BRAKE

(75) Inventors: Wayne R. Lumpkin, Littleton; Michael T. Mayberry, Denver, both of CO (US)

(73) Assignee: Avid LLC, Englewood, CO (US)

( * ) Notice: Subject to any disclaimer, the term of this patent is extended or adjusted under 35 U.S.C. 154(b) by 0 days.

(21) Appl. No.: 09/746,908

(22) Filed: Dec. 23, 2000

Related U.S. Application Data

(60) Provisional application No. 60/195,560, filed on Apr. 6, 2000.

(51) Int. Cl.$^7$ .................................................. B62L 1/02
(52) U.S. Cl. ................ 188/24.12; 188/234; 188/250 B; 188/26; 188/73.1; 188/73.38; 188/73.32; 188/73.31; 188/2 D; 188/24.22
(58) Field of Search ............................. 188/73.1, 24.22, 188/24.12, 250 B, 250 G, 72.8, 73.32, 234, 73.37, 73.38, 244, 245, 73.33, 73.31, 73.46, 73.39, 73.43; 192/70.13

(56) References Cited

U.S. PATENT DOCUMENTS

| | | | |
|---|---|---|---|
| 2,379,796 A | | 7/1945 | Freeman et al. |
| 3,162,271 A | * | 12/1964 | Hanson ..................... 188/73.1 |
| 3,194,347 A | * | 7/1965 | Hall |
| 3,838,754 A | * | 10/1974 | Schoenhenz |
| 3,899,051 A | * | 8/1975 | Grosseau |
| 3,935,930 A | | 2/1976 | Kine |
| 3,998,295 A | | 12/1976 | Martin |
| 4,061,208 A | | 12/1977 | Nishiyama |
| 4,093,043 A | | 6/1978 | Smith |
| 4,326,614 A | * | 4/1982 | Matagrano |
| 4,356,897 A | | 11/1982 | Urban |
| 4,417,647 A | * | 11/1983 | Cotter et al. ............ 188/73.38 |
| 4,441,588 A | * | 4/1984 | Saito ....................... 188/73.38 |
| 4,469,205 A | * | 9/1984 | Stoka et al. |
| 4,471,858 A | * | 9/1984 | Kawasa |
| 4,951,409 A | * | 8/1990 | Froid |
| 5,358,078 A | | 10/1994 | Gajek et al. |
| 5,624,334 A | | 4/1997 | Lumpkin |
| 5,632,362 A | | 5/1997 | Leitner |
| 6,003,639 A | | 12/1999 | Buckley et al. |
| 6,075,221 A | * | 6/2000 | Minhas |
| 6,230,849 B1 | | 5/2001 | Lumpkin |
| 6,340,074 B1 | * | 1/2002 | Lumpkin et al. |

FOREIGN PATENT DOCUMENTS

FR             1178184     *    7/1957

OTHER PUBLICATIONS

Wholesale Distributor BTI Catalog, "Pads: Disc", pp. 82, (2000).

* cited by examiner

*Primary Examiner*—Douglas C. Butler
(74) *Attorney, Agent, or Firm*—Swanson & Bratschun LLC

(57) ABSTRACT

A caliper of a disc brake assembly includes a housing with a cavity configured to receive a disc brake of a disc brake assembly. The cavity includes opposing recesses configured to nest first and second friction pad and plate assemblies on opposite sides of the disc. A drive within the caliper housing advances the first friction pad assembly into contact with the disc along an advancement axis. A retaining structure for the first friction pad and plate assembly includes a pad retention clip attached to the housing within the cavity, the pad retention clip defining an elongate track extending along the advancement axis. A retention tab on a plate of the first friction pad and plate assembly is configured to snap fit with the pad retention clip and to move along the advancement axis within the elongate track as the first friction pad and plate assembly is advanced along the advancement axis by the caliper drive.

16 Claims, 24 Drawing Sheets

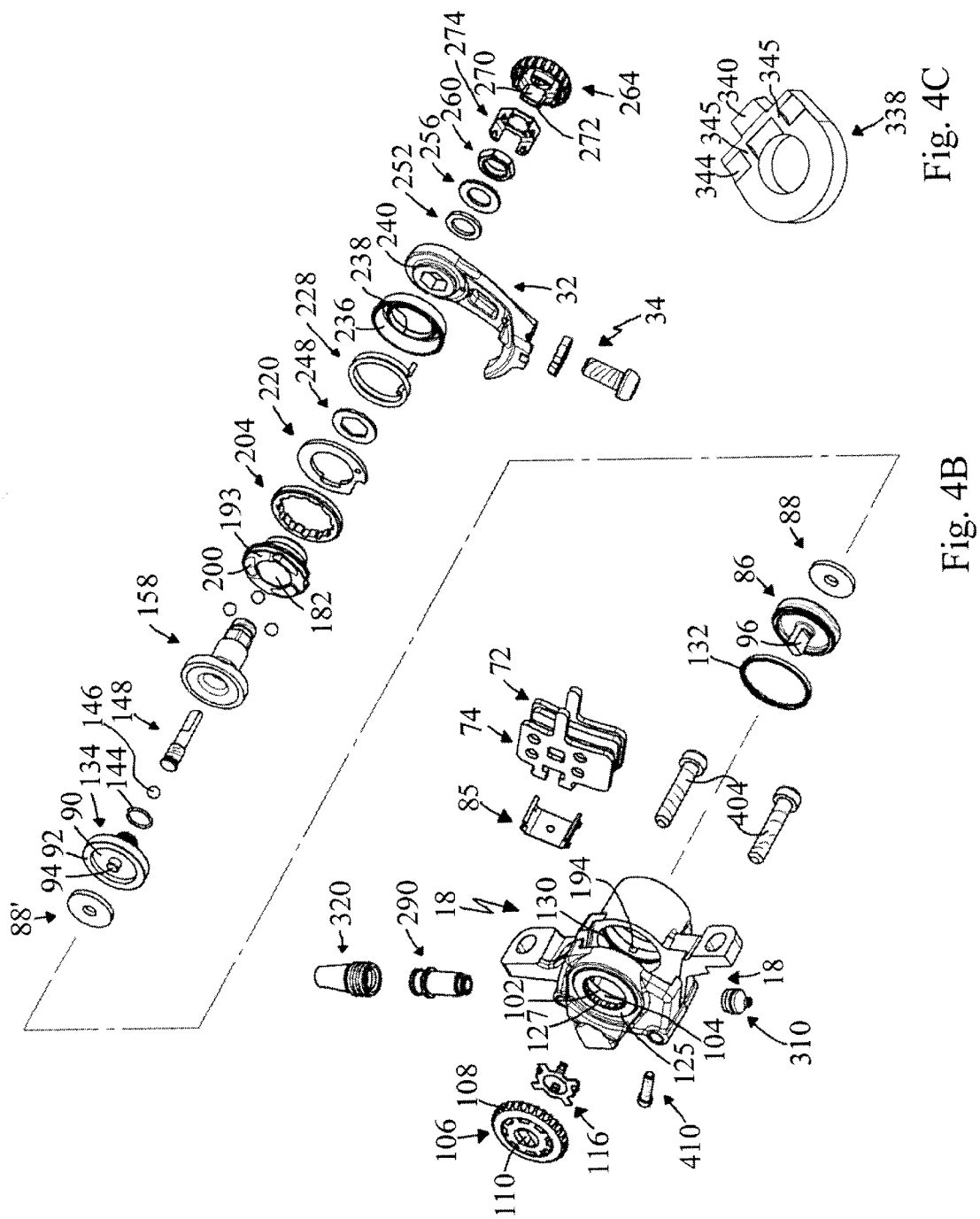

FRICTION PAD ASSEMBLY FOR A DISC BRAKE

RELATED APPLICATIONS

This application claims priority from U.S. Provisional Patent Application Serial No. 60/195,560, filed Apr. 6, 2000, entitled "Mechanical Disc Brake Caliper", the contents of which are incorporated herein in their entirety.

TECHNICAL FIELD

The present invention is directed toward bicycle disc brakes, and more particularly toward a retaining structure for a friction pad and plate assembly of a caliper of a disc brake.

BACKGROUND ART

Disc brakes are being included on more and more bicycles as consumers are ever increasingly demonstrating a preference for disc brakes over conventional rim brakes such as caliper brakes, cantilever brakes and side pull cantilever brakes. Disc brakes typically include a friction pad and plate assembly which is operatively associated with a caliper of the disc brake assembly. More particularly, the caliper typically includes a cavity configured to receive a disc of the disc brake assembly, with the cavity having a mouth at a leading end and a pair of opposing recesses configured to receive a pair of the friction pad and plate assemblies on opposite side of the disc with the caliper further having a drive advancing the pad of at least one of the friction pad and plate assemblies into contact with the disc along an advancement axis. The friction pad of the pad and plate assembly is intended to wear with use and the pad and plate assembly must be replaced from time to time. Thus, a suitable retaining structure allowing for replacement of the pad and plate assembly is used. This general structure is widely used in to industry.

There are a number of known retaining structures for friction and plate assemblies. Some of these require special tools to remove the friction pad and plate assembly. In other instances, the pad and plate assembly snap into place by being advanced along an advancement axis into engagement with a pressure foot. While this later structure has the advantage of not requiring any tools to install and remove the friction pad and plate assembly, it does not adequately secure the pad and plate assembly to prevent unintentional disengagement or misalignment of the pad and plate assembly when the disc is not disposed between opposing recesses receiving the pad and plate assemblies. Thus, there remains a need to provide a retaining structure for a pad and plate assembly that allows the pad and plate assembly to readily removed and replaced without tools while securing the pad and plate assembly when installed against unintentional dislodging.

The present invention is directed toward overcoming one or more of the problems discussed above.

SUMMARY OF THE INVENTION

The first aspect of the present invention is a retaining structure for a friction pad and plate assembly of a caliper of a disc brake assembly. The caliper of the caliper disc brake assembly includes a housing with a cavity configured to receive a disc of the disc brake assembly. The cavity includes opposing recesses configured to nest first and second friction pad and plate assemblies on opposite sides of the disc. A drive within the caliper housing advances the pad of the first friction pad and plate assembly into contact with the disc along an advancement axis. The retaining structure includes a pad retention clip attached to the housing within the cavity. The pad retention clip defines an elongate, track extending along the advancement axis. A retention tab on a plate of the first friction pad and plate assembly is configured to snap fit with the pad retention clip and to move along the advancement axis within the elongate track as the first friction pad and plate assembly is advanced along the advancement axis by the caliper drive. The retention clip preferably extends along the advancement axis substantially the same distance as the cavity mouth. Each plate of the first and second friction pad and plate assemblies has a retention tab and both the first and second pad and plate assemblies are snap fit into the same retention clip on opposite sides of the disc. The retaining structure preferably further includes a pressure foot associated with the caliper drive abutting a back side of the plate of the first pad and plate assembly opposite the pad. A keyed engagement structure between the pressure foot and the back side of the plate is brought into engagement by advancing the pad and plate assembly toward the pressure foot along the advancement axis with the keyed engagement structure, when engaged, preventing release of the pad and plate assembly from the pad retention clip by movement of the pad and plate assembly transverse the advancement axis. The plate of the pad and plate assembly may be made of a ferrous material and the pressure foot may includes a magnet to releasably attach the plate to the pressure foot.

Another aspect of the present invention is a backing plate of a pad and plate assembly. The pad and plate assembly is for use with a caliper of a disc brake assembly, the caliper having a housing with a cavity configured to receive a disc of the disc brake assembly. The cavity mouth has a leading end and a pair of receiving recesses configured to nest a pair of backing plates on opposite sides of the disc. The caliper drive advances the friction pad of at least one of the pad and plate assemblies into contact with the disc along an advancement access. A pad retention clip is attached to the housing within the cavity opposite the mouth of the cavity. The pad retention clip has a pair of retaining legs opening towards the mouth. The backing plate consists of a body having a leading edge and a trailing edge disposed along an advancement access. A retention tab is on the leading edge of the body that has oppositely extending protrusion dimensioned to snap fit between the retaining legs of the pad retention clip by advancing the body along the engagement access and engaging the pad retention clip with the retention tab. The backing plate may further include opposing side edges extending between the leading and trailing edges with the opposing side edges mating with corresponding side walls of the cavity recess to enable sliding movement of the backing plate along the advancement access within the cavity. An elongate handle may extend from the body along the trailing edge of the body. Preferably a structure is provided on the handle for enhancing gripping of the handle. The drive may further include a pressure foot abutting a backing plate, with the pressure foot having a post extending along the advancement axis. With this structure, the backing plate further comprises a leading surface and a trailing surface, with the trailing surface having a receptacle for receiving the post.

Yet another aspect of the present invention is a method of releasably attaching a friction pad and plate assembly to a caliper of a disc brake assembly. The caliper has a housing with a cavity configured to receive a disc of the disc brake assembly. The cavity includes a mouth at a leading end for receiving first and second pad and plate assemblies on opposite sides of the disc received therein. A drive within the housing advances the pad of the first pad and plate assembly into contact with the disc along an advancement axis. The method includes providing a releasable snap fitting between the plate of the first friction pad and plate assembly and a wall of the caliper housing cavity. The releasable snap fitting, when engaged, permits movement of the pad and plate assembly along the advancement axis and resists movement of the pad and plate assembly along an engagement axis transverse the advancement axis. The method further includes providing a keyed fitting aligned along the advancement axis between a backside of the plate opposite the pad of the pad and plate assembly and a pressure foot associated with the caliper drive. The keyed fitting, when engaged, prevents movement of the pad and plate assembly along the engagement axis. The friction pad and plate assembly is advanced within the cavity along the engagement axis to engage the releasable snap fitting and then advanced within the cavity along the advancement axis to engage the keyed fitting.

Yet another aspect of the present invention is a backing plate of a pad and plate assembly for use with a caliper of a bicycle disc brake assembly. The backing plate includes a body having a leading planar surface for attachment to a brake pad. A handle is attached to and extends from the body. A structure is provided on the handle for enhancing gripping of the handle.

The retaining structure for a friction pad and plate assembly of the present invention allows for quick and easy installation and removal of the friction pad and plate assemblies. The structure also provides for secure engagement of the pad and plate assembly to the caliper. Once installed, inadvertent dislodging or misalignment of the pad and plate assembly with the disc removed is highly unlikely. This is particularly important when a wheel of the bicycle is removed, such as when the bicycle is attached to certain carrying racks. Notwithstanding the sure engagement, the pad and plate assembly can be quickly and easily disengaged from the caliper without tools by a simple two-step movement, first along an advancement axis and then along an engagement axis. The retaining structure consists of a minimum number of parts which can be inexpensively manufactured and readily assembled.

BRIEF DESCRIPTION OF THE DRAWINGS

FIG. 4B is an exploded perspective view from a perspective rotated 180° from that of FIG. 4A;

FIG. 4C is a bottom perspective view of a clamp plate in accordance with the present invention;

DETAILED DESCRIPTION OF THE PREFERRED EMBODIMENT

Figure 1:
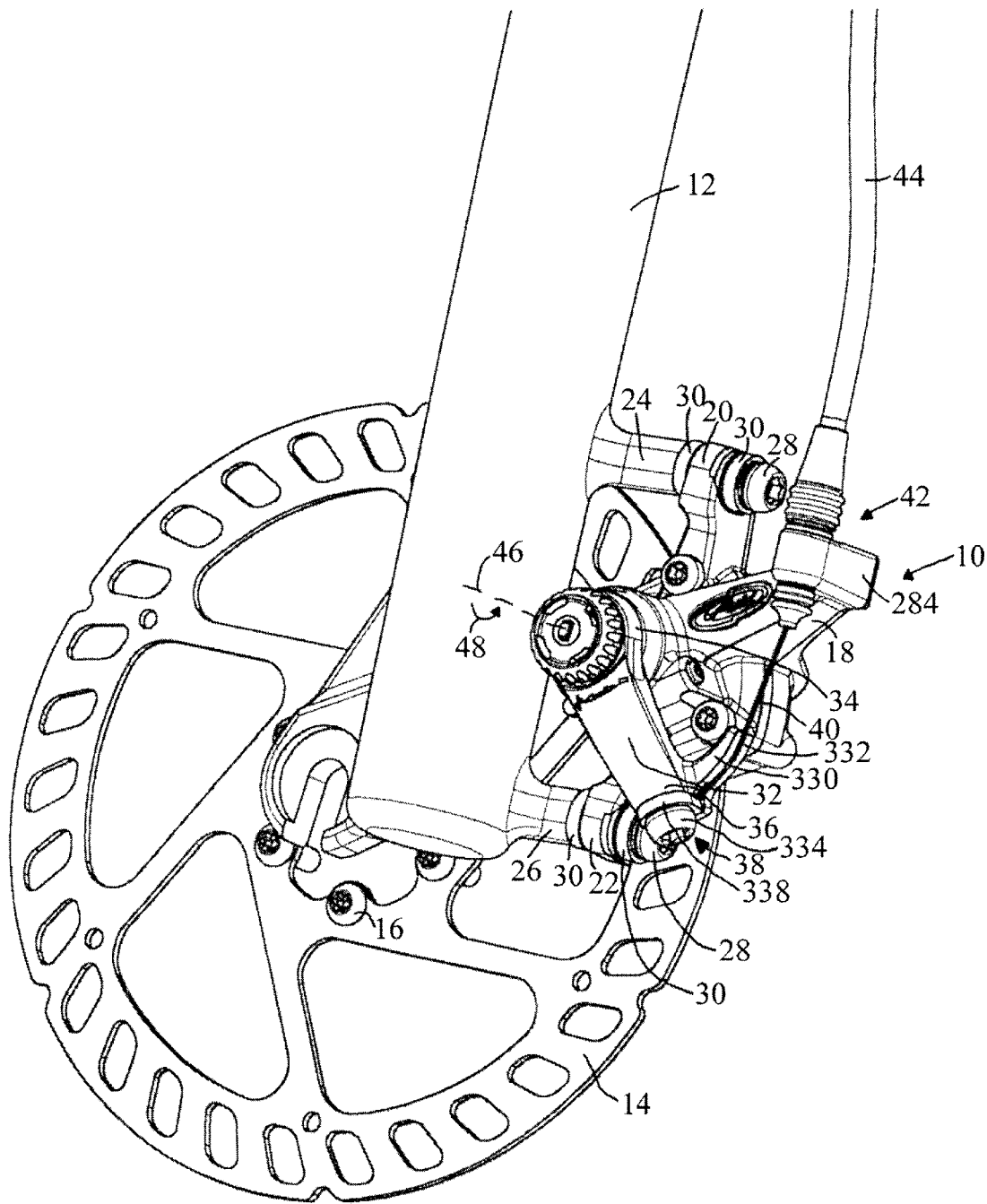
FIG. 1 is a perspective view showing a ball bearing mechanical disc brake caliper of the present invention mounted to a fork of a bicycle in operative engagement with a brake disc.
Figure 2:
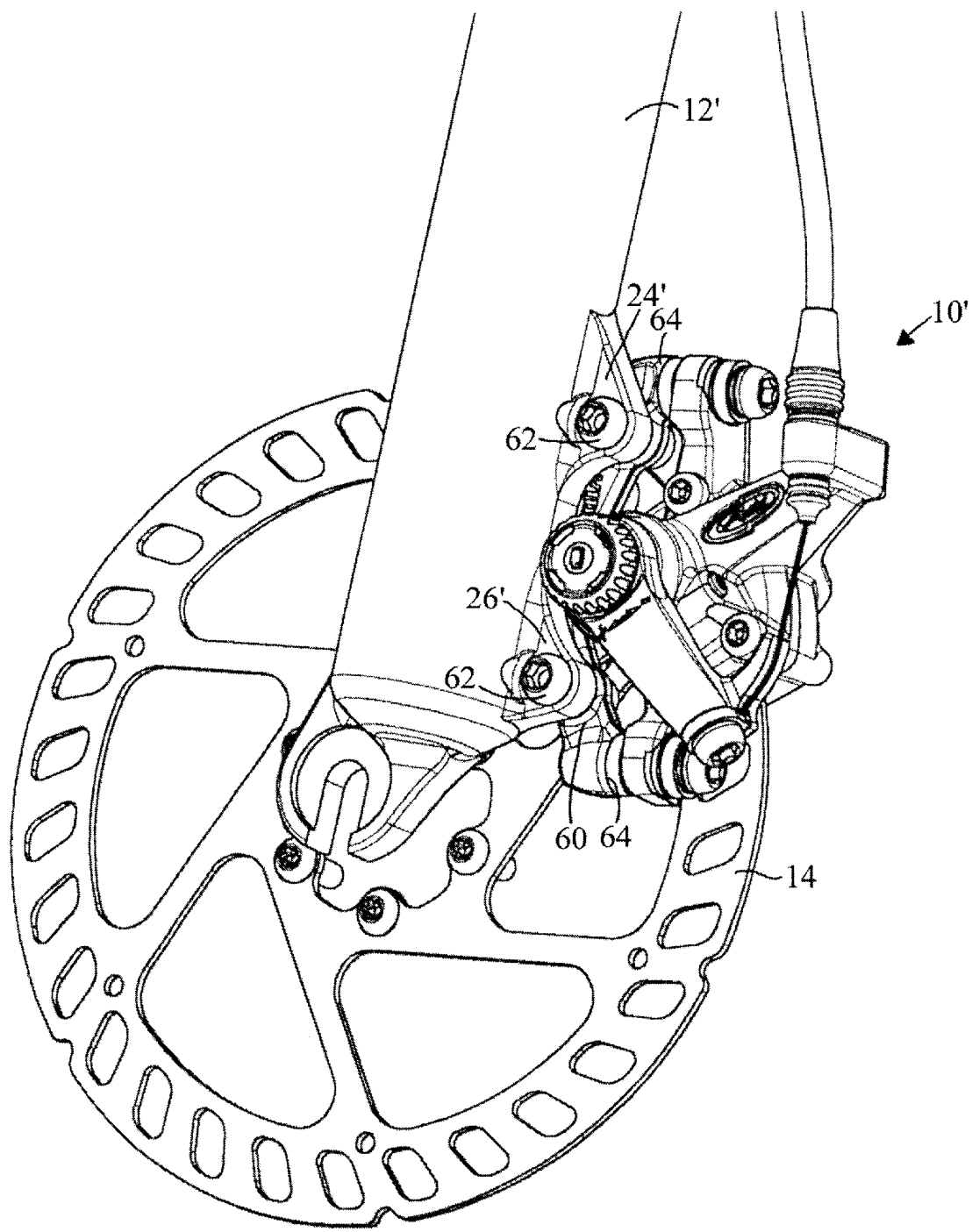
FIG. 2 is the ball bearing mechanical disc brake caliper of FIG. 1 including an adaptor for mounting to a frame with different mounts.

A ball bearing mechanical disc brake caliper 10 in accordance with the present invention is shown in FIG. 1 mounted to a frame or, more particularly, a front fork 12 of a bicycle in operative engagement with a disc 14. As shown in FIGS. 1–3, the caliper 10 is mounted to a front fork 12 for use with a front wheel. For use with the rear wheel, the caliper is typically mounted to the seat stay, chain stay, drop out plate, after market adapter or the like. The disc 14 in turn is rigidly mounted to the hub of a wheel assembly by the bolts 16. For the sake of clarity, the bicycle wheel and hub are not shown.

The ball bearing mechanical disc brake caliper consists of a caliper housing 18 having a pair of mounting feet 20, 22 extending therefrom for attachment to a corresponding pair of internally threaded attachment bosses 24, 26 which extend from the front fork 12. A pair of mounting bolts 28 secure the mounting feet 20, 22 to the attachment bosses 24, 26. The mounting feet preferably include elongate slots 27 (see FIG. 5) receiving the mounting bolts 28 and complimentary pairs of concave/convex washers 30 to provide for adjustable attachment of the ball bearing mechanical disc brake caliper to a bicycle frame. Such an attachment structure is described in detail in applicant Wayne Lumpkin's, U.S. Pat. No. 6,230,849 the disclosure of which is hereby incorporated in its entirety herein.

As seen in FIG. 1, a lever arm 32 is pivotably attached at a first end 34 to the caliper housing 18. A second end of the lever arm 36 has a cable clamp 38 which secures an end of the cable 40. The cable 40 is directed through a cable feed 42 attached to the caliper housing 18 with a cable housing 44 abutting the cable feed 42. While the operation of the ball bearing mechanical disc brake will be described in considerably greater detail below, it is useful at the outset to understand that the ball bearing mechanical disc brake caliper is actuated by tension being applied to an opposite end of the cable 40 by a cable actuator such as a conventional cable brake lever (not shown) and this tension causes the lever arm 32 to pivot about pivot axis 46 in the direction of arrow 48 so that the second end of the lever arm 36 is drawn toward the cable guide 42 to advance a brake pad into contact with the disc 14 by a rotary to linear linkage between the first end 34 of the lever arm 32 and the brake pad.

FIG. 2 shows the ball bearing mechanical disc brake caliper 10 mounted to a front fork 12' having internally threaded attachment bosses 24' and 26' with an axis parallel to the axis of rotation of the disc 14. The ball bearing mechanical disc brake caliper 10' is in all manner identical to the ball bearing mechanical disc brake 10 described above with regard to FIG. 1. For simplicity, all unnecessary corresponding reference numbers have been omitted. An adapter bracket 60 is fastened by a pair of bolts 62 to the attachment bosses 24', 26' and includes a pair of internally threaded receptor bores 64 that enable the caliper housing 18 to be attached to the front fork 12' in an identical position relative to the disc 14 described above with respect to FIG. 1. Thus, the adapter bracket provides an equivalent mounting surface to that provided by the attachment bases 24, 26, as shown in FIG. 1.

Figure 3A:
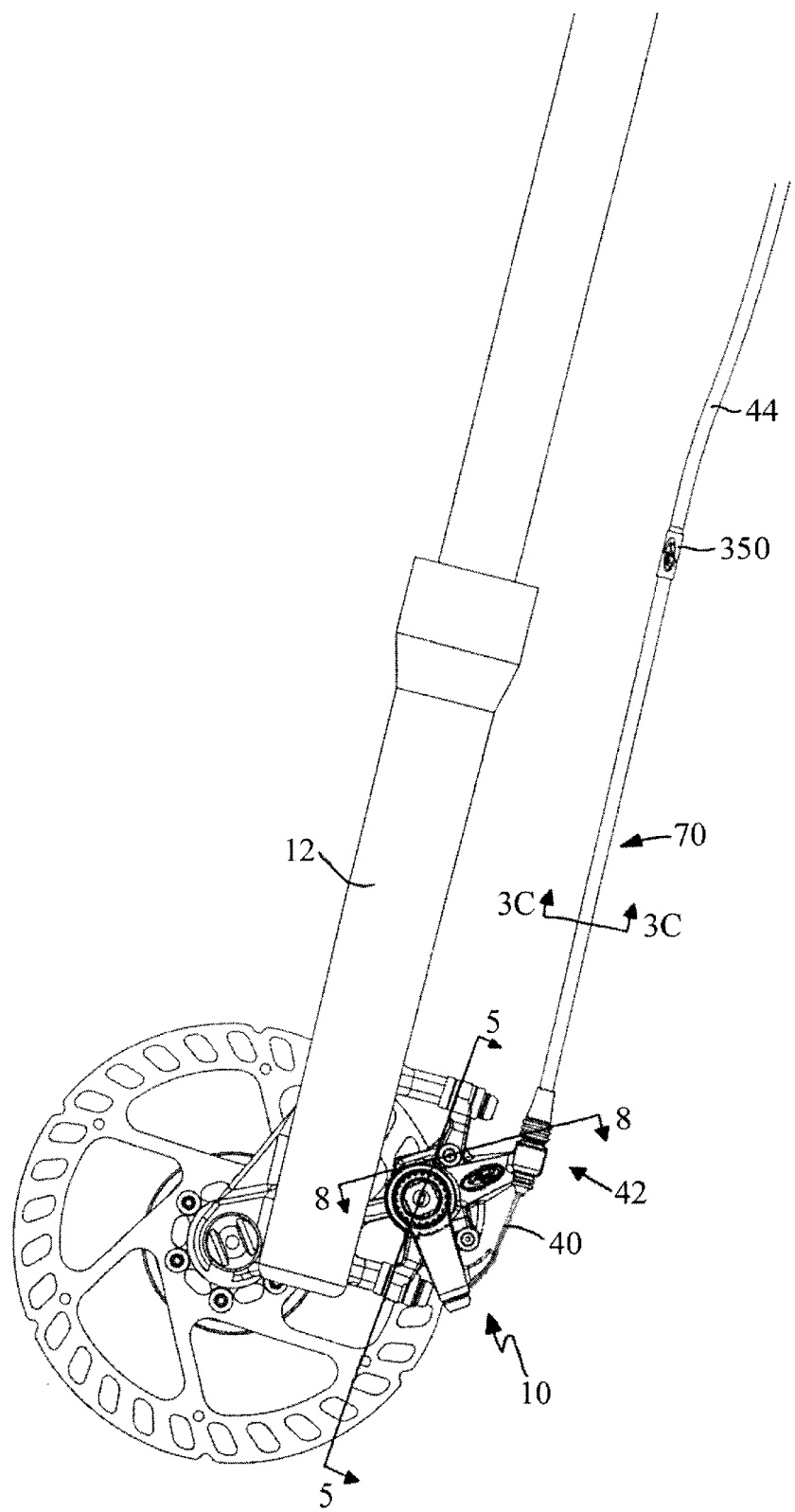
FIG. 3A is a front elevation view of the ball bearing mechanical disc brake caliper of FIG. 1 including a floating cable stop.

FIG. 3A is a front elevation view of the ball bearing mechanical disc brake caliper 10 mounted to a bicycle frame 12 as illustrated in FIG. 1. FIG. 3 differs from FIG. 1 by the inclusion of the floating cable stop 70, which will be described in greater detail below.

Figure 4A:
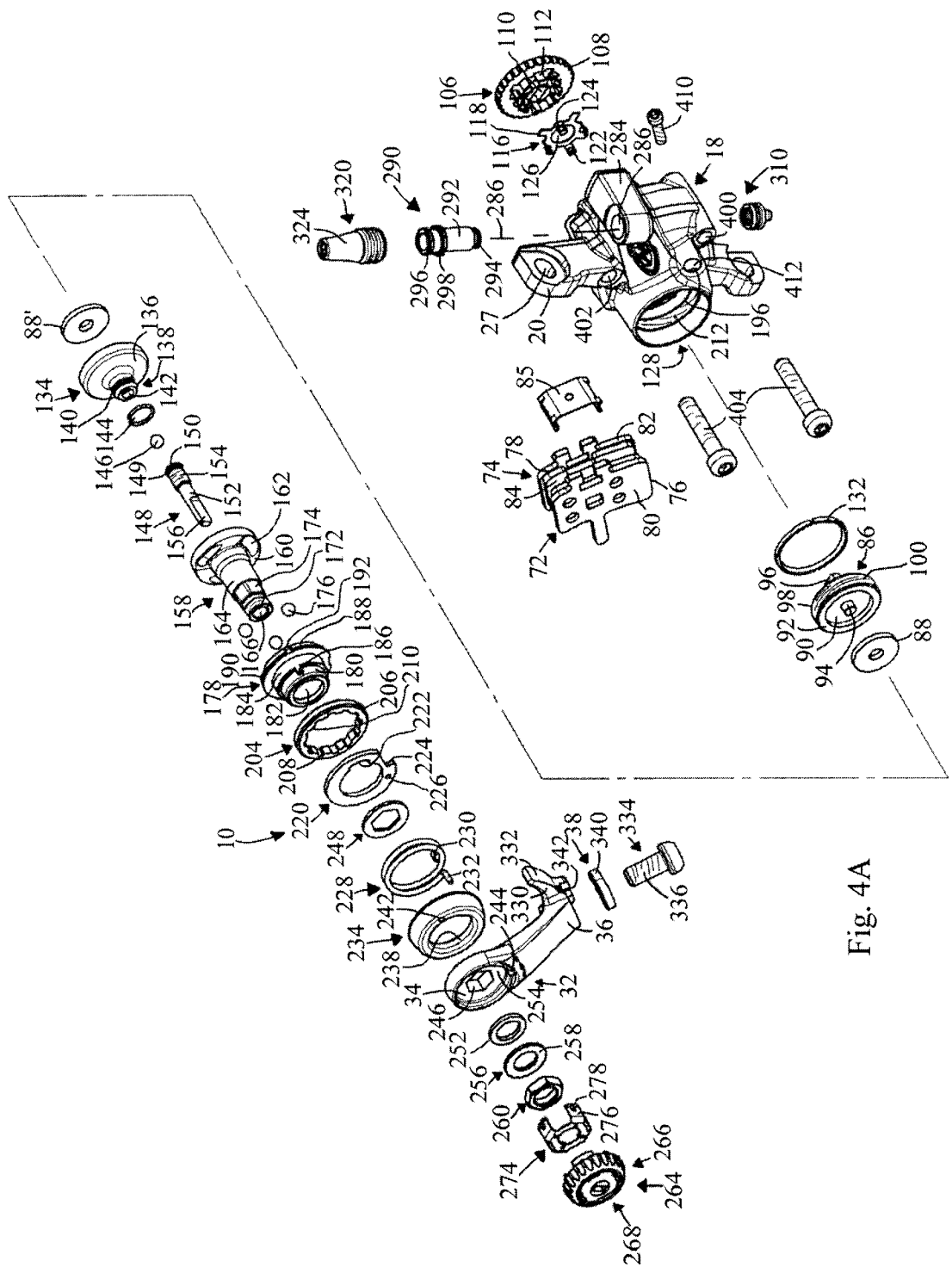
FIG. 4A is an exploded perspective view of the ball bearing mechanical disc brake caliper of FIG. 1.

The ball bearing mechanical disc brake caliper 10 is shown in an exploded perspective view in FIG. 4A. FIG. 4B is identical to FIG. 4A, only the perspective is rotated 180°. First and second brake pad assemblies 72, 74 consist of mirror image backing plates 76, 78 each having a trailing surface 80 including a post receiving receptacle 81 and a leading surface 82 to which a brake pad 84 is permanently adhered. When the ball bearing mechanical disc brake caliper is operatively associated with a disc 14, the disc 14 resides between the pads 84 of the first and second brake pad assembly 72, 74 which are held in place in part by a pad retention clip 85 in a manner which will be described in greater detail below.

Figure 5:
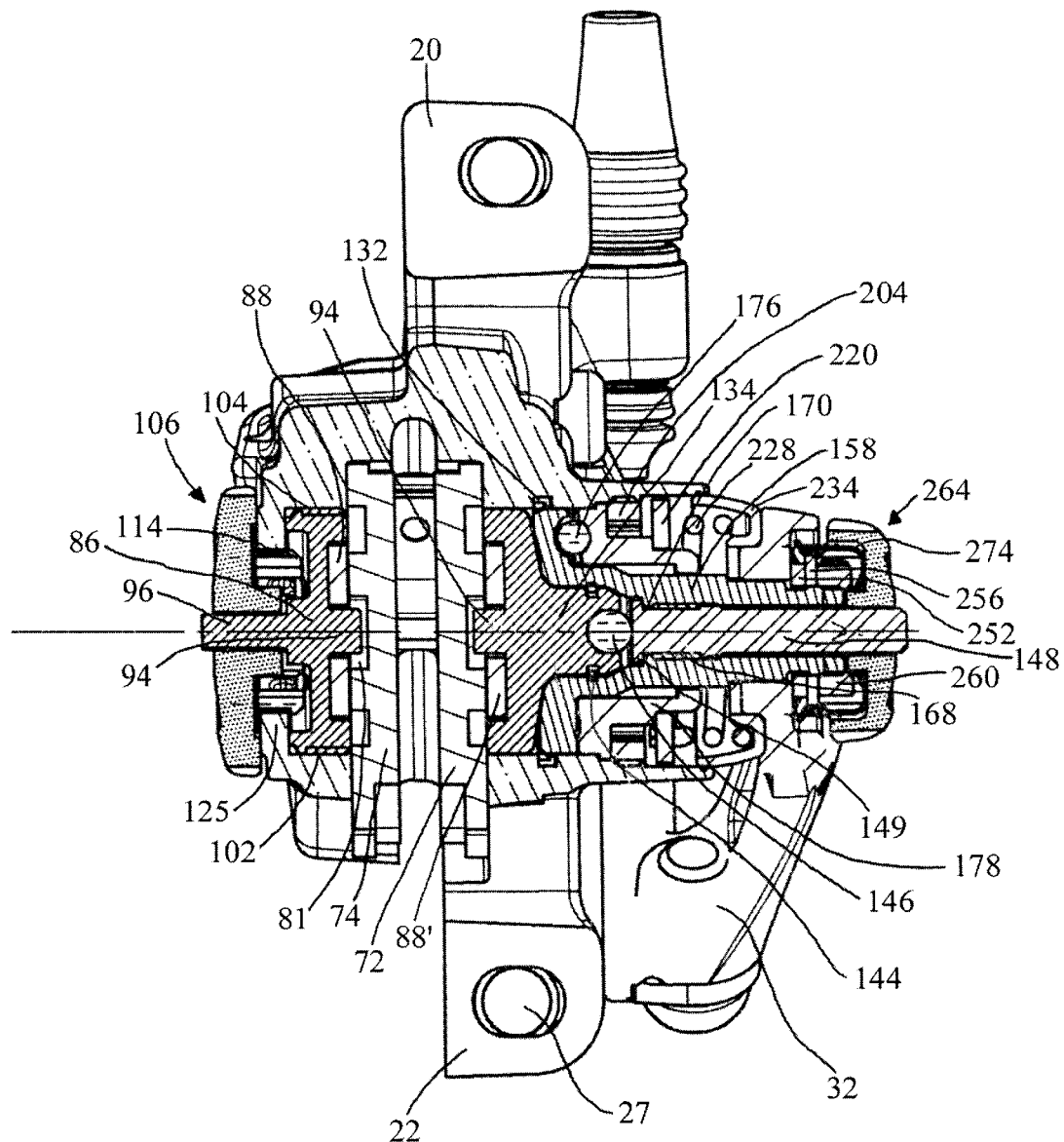
FIG. 5 is a cross-section of the ball bearing mechanical disc brake caliper taken along line 5—5 of FIG. 3A with the brake pads retracted.

As oriented in FIG. 4A, the second brake pad assembly 74 is also known as the back or inboard brake pad assembly. A pad wear compensator 73 for the inboard pad assembly includes inboard pressure foot 86, which as discussed below, functions as an indicator. The inboard brake pad assembly 74 is attached to the inboard pressure foot 86 by means of a washer-shaped magnet 88 which is adhered to a cooperatively shaped receptacle 90 in the leading surface 92 of the inboard pressure foot 86. An axial post 94 extends through the hole in the washer-shaped magnet 88 and protrudes beyond the leading surface 92 to engage the post receiving receptacle 81 in the trailing surface of the backing plate. A trailing portion or indicator dog 96 having a rectangular cross-section extends from a trailing surface of the inboard pressure foot 86 along the same axis of the axial post 94. The edge of the inboard pressure foot 86 is threaded as indicated at 100 between the leading surface 92 and the trailing surface 98. The threads 100 are sized to threadably engage complimentary threads 102 in the inner diameter of an inside cylinder 104 of the caliper housing 18 (see FIGS. 4B and 5). This threaded engagement allows for linear advancement of the pressure foot as it is rotated. An inboard pad advancement adjustment knob 106 has knurled edge 108, an axial orifice or hole 110. The axile hole is configured snugly, axially, slidably receive the indicator dog 96 of the inboard pressure foot 86 but to prevent rotation between the pressure foot and the adjustment knob. A plurality of axially inward extending legs 112 having radially outwardly extending barbs 114 at their distal ends. An inside indexing spring clip 116 has a plurality of radially extending legs 118 sized to be received between the axially inwardly extending legs 112 of the inner knob 106. The inside indexing spring clip 116 further includes axially inwardly extending bars 122 having radially outward extending detents 123 at their distal ends. As best seen in FIG. 5, the dog 96 extends through the hole 126 in the inside indexing spring clip 116 and into the axial hole 110 in the inner knob 106. The barbs 114 engage an inner edge of an inward extending annular flange 125 to lock the inner knob 106 against axial movement. The detents 123 in turn engage equally circumferentially spaced indexing knurls 127 in the inner surface of the flange 125. As will be described below, the complimentary detents and indexing knurls provide a tactile indication of pad adjustment as the inboard knob 106 is rotated.

With continued reference to FIGS. 4A, 4B and 5, the caliper housing 18 also includes an outboard cylinder 128 which is coaxial with the inboard cylinder 104. The bulk of the remaining components of the ball bearing mechanical disc brake caliper 10 reside within the outboard cylinder 128. The outboard cylinder 128 has an annular groove 130 (see FIG. 4B) in its inner diameter sized to receive the hoop-shaped polymer dust seal 132. Outboard pressure foot 134 has an identical leading surface to the leading surface 92 of the inboard pressure foot 86 and identical reference numbers are used in FIG. 4B. Washer-shaped magnet 88', which is identical to washer-shaped magnet 88, is adhered within the cooperative shaped receptacle 90 of the leading surface 92 of the outer pressure foot 134. The outside or first brake pad assembly 72 is attached by the washer-shaped magnet 88' to the leading surface of the outer pressure foot 134. The trailing surface 136 has an axially extending post 138 having an annular groove 140 in its sidewall near the distal end. In the distal end is an axial cup 142. Split ring 144 is sized to be received in the annular groove 140. Ball bearing 146 is sized to be received in and to extend axially from the axial cup 142.

An indicator foot screw 148 has a head 149 with a leading surface 150 which abuts the ball bearing 146. Behind the head 149 is a shaft 152 which is threaded adjacent to the head 149 as indicated at 154. The trailing end of the shaft 152 has a pair of flats 156 (one shown in FIG. 4A) on opposite sides. The indicator foot screw 148 is an integral part of a pad wear compensator 153 for the outboard brake pad assembly.

Figure 7:
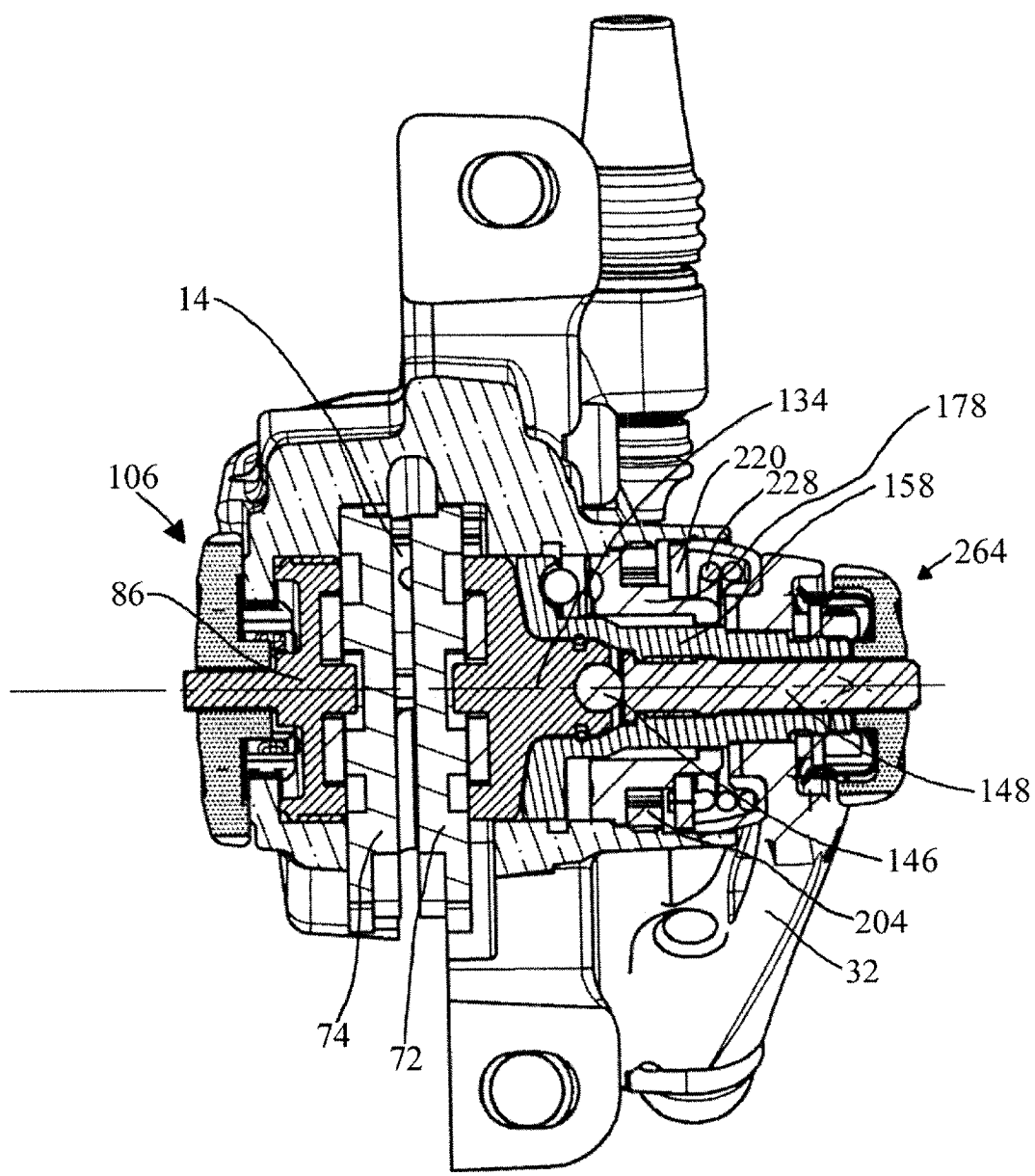
FIG. 7 is the same as FIG. 5 only it illustrates the brake pads advanced by the drive mechanism into contact with a disc.
Figure 8:
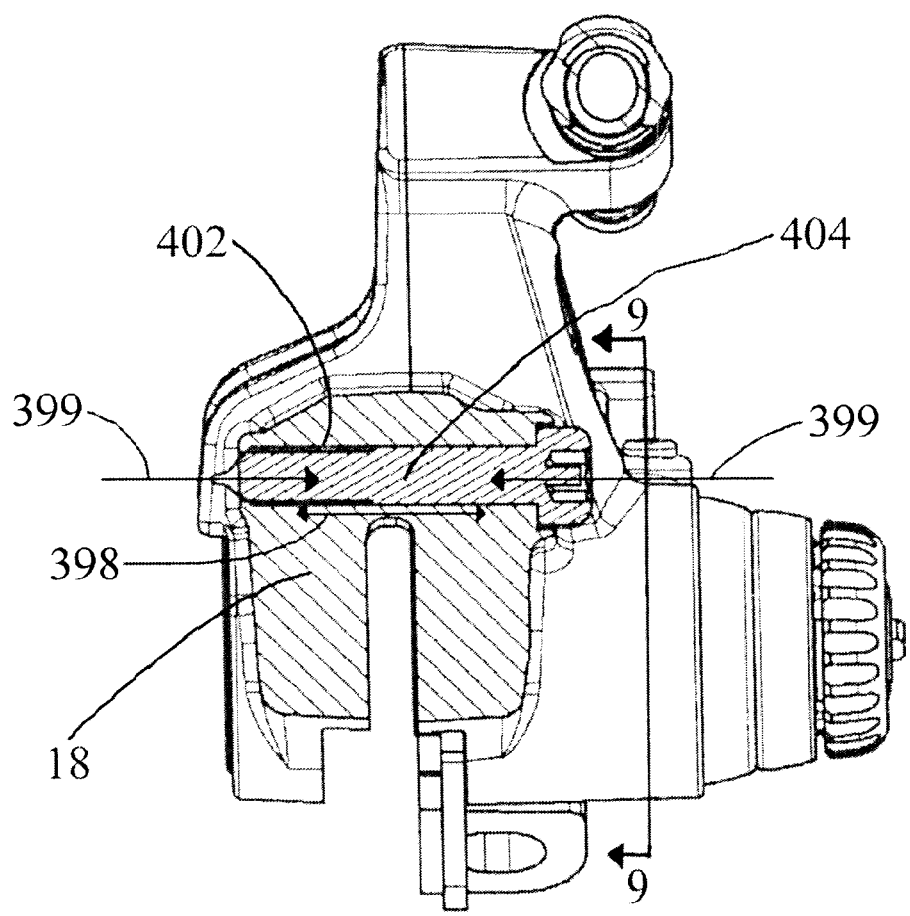
FIG. 8 is a cross-section of the ball bearing mechanical disc brake caliper taken along line 8—8 of FIG. 3A.

Drive cam 158 has an enlarged diameter base 160 having a plurality of equally spaced curved, ramped grooves 162 in its trailing surface. The preferred embodiment has three ramped grooves 162 spaced at 120°. A cylindrical shaft 164 extends rearward of the enlarged diameter base 160 and has an axial bore 166 which extends axially through the drive cam 158. As best viewed in FIG. 5, the axial bore includes a threaded inner diameter portion 168 which threadably engages the threaded portion 154 of the foot screw 148 with the shaft 152 extending rearwardly from the axial bore 166. Further referring to FIG. 5, an inwardly extending flange 170 acts as a stop against a rearward portion of the head 149. The distal end of the outside cylindrical shaft 164 is threaded at 172 and adjacent the treaded portion 172 is a hex portion 174. One of three ball bearings 176 resides in each ramped groove 162. The outer diameter of the enlarged diameter base 160 is sized to fit snugly within the inner diameter of the outside cylinder 128 and have a sealing relationship with the dust seal 132 as best seen in FIGS. 5 and 7.

Fixed cam 178 has a generally cylindrical body 180 with a constant inner diameter orifice 182. An intermediate step 184 has a spring tension limiting boss 186 which extends axially onto the cylindrical body 180. A leading step 188 has an outer diameter greater than that of the intermediate step 184 and an enlarged outside diameter annular flange 190 rises from the leading step 188 adjacent the intermediate step 184. A locking boss 192 extends toward the leading surface 193 collinearly with the spring tension limiting boss 186 at a height matching that of the enlarged outer diameter annular flange 190. The locking boss 192 is sized to key into a receiving slot 194 in the inner diameter of the outside cylinder 128 to lock the fixed cam 178 against axial rotation (see FIG. 4A). In addition, the leading surface of the enlarged outer diameter annular flange 190 abuts a step 196 in the inner diameter of the outside cylinder 128 to halt axial insertion of the fixed cam 178 into the outside cylinder 128 from the opened end as viewed in FIG. 4A. The engaged relationship can best be seen in FIG. 5. The leading surface 193 of the fixed cam 178 is best viewed in FIG. 4B. The leading surface has a plurality of equally circumferentially spaced ramped grooves corresponding to the ramped grooves of the drive cam 158. FIG. 4B shows three ramped grooves 200 spaced at 120° which correspond to the ramped grooves 162 of the drive cam 158, only with the ramps extending circumferentially in opposite directions when aligned as shown in FIGS. 4A, 4B and 5–7. A ball bearing 176 resides between each ramped groove pair 162, 200 as best viewed in FIGS. 5–7. Referring to FIG. 5, with balls residing in the grooves 162, 200, the grooves and ball bearings act as an angular contact bearing which is able to accommodate axial loads on the drive cam exerted by the lever arm 32. In addition, the ramped grooves self-center the drive cam shaft 164 within the inner diameter 182 of the fixed cam 178 with the drive cam under an axial load. This feature eliminates the need for an optional split bushing (not shown) being press fit in the inner diameter 182 of the fixed cam 178. It further eliminates friction between the drive cam shaft 164 and fixed cam 178. It further reduces needs for tight tolerances between the drive cam shaft 164 and fixed cam 178, thus eliminating the need for costly centerless grinding of the drive cam shaft and reaming of the fixed cam bore 182. These combined advantages significantly improve performance and minimize parts cost and assembly complexity and attendant cost.

When the fixed cam is seated within the outside cylinder 128 as described above and as viewed in FIG. 5, it is locked against axial movement by locking ring 204 which has a threaded outer diameter 206 and evenly spaced engagement slots 208 in the inner diameter 210. The inner diameter is sized to snugly receive the intermediate step 184 of the fixed cam 178 and the engagement slots 208 allow for engagement by a special turning tool (not shown) so that the threaded outer diameter 206 can be brought into threaded engagement with corresponding threads 212 in the inner diameter of the outside cylinder 128.

A generally washer-shaped spring tension biasing plate 220 has an inner diameter which snugly axially receives the intermediate step 184 of the fixed cam 178 and includes a spring tension limiting slot 222 which receives the spring tension limiting boss 186. A cut in the outer diameter of the spring tension biasing plate forms a stop surface 224. Near the stop surface 224 is a hole 226. Return spring 228 has a pair of axially extending ends 230, 232. The inner diameter of the return spring 228 is large enough to axially receive the fixed cam 178 and the shaft 164 of the drive cam 158 as best viewed in FIG. 5. The axially extending end 230 is received in the hole 226 of the spring tension biasing plate 220 (see FIG. 5). A dust seal 234 defines an annular cover 236 for the return spring 228 as seen in FIGS. 4B and FIGS. 5–7. The inner diameter of the trailing orifice 238 is sized to receive and have a sealing relationship with the outer diameter of a leading flange 240 of the lever arm 32. A hole 242 in the trailing surface of the cover 236 receives the axially extending rod 232. The axially extending rod 232 in turn is received in the hole 244 near the first end 34 of the lever arm 32.

A hex orifice 246 near the first end 34 of the lever 32 axially receives the hex portion 174 of the cylindrical shaft 164 of the drive cam 158 with a hex inner diameter washer 248 therebetween to radially fix the lever arm 32 to the drive cam 158. Washer 252 abuts the trailing surface 254 and is sandwiched by a larger outer diameter washer 256. The larger outer diameter washer 256 has a number of equally circumferentially spaced indexing knurls 258 in its outer diameter. The washers 252, 256 and the lever arm 32 are axially secured to the cylindrical shaft 164 of the drive cam 158 by nut 260 which threadably engages the threaded portion 172 of the cylindrical shaft 164.

Figure 14:
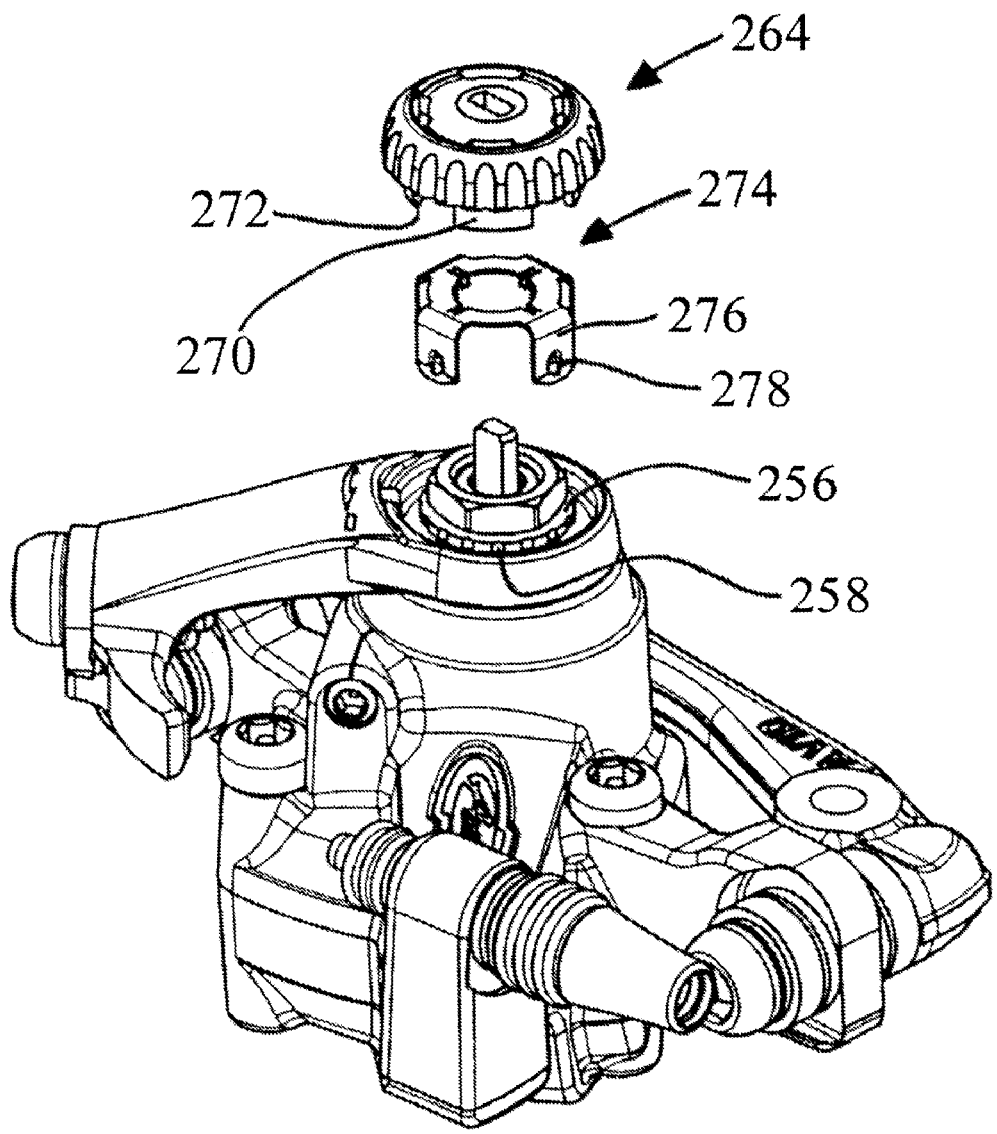
FIG. 14 is an exploded view of the outer indexing knob assembly.
Figure 15:
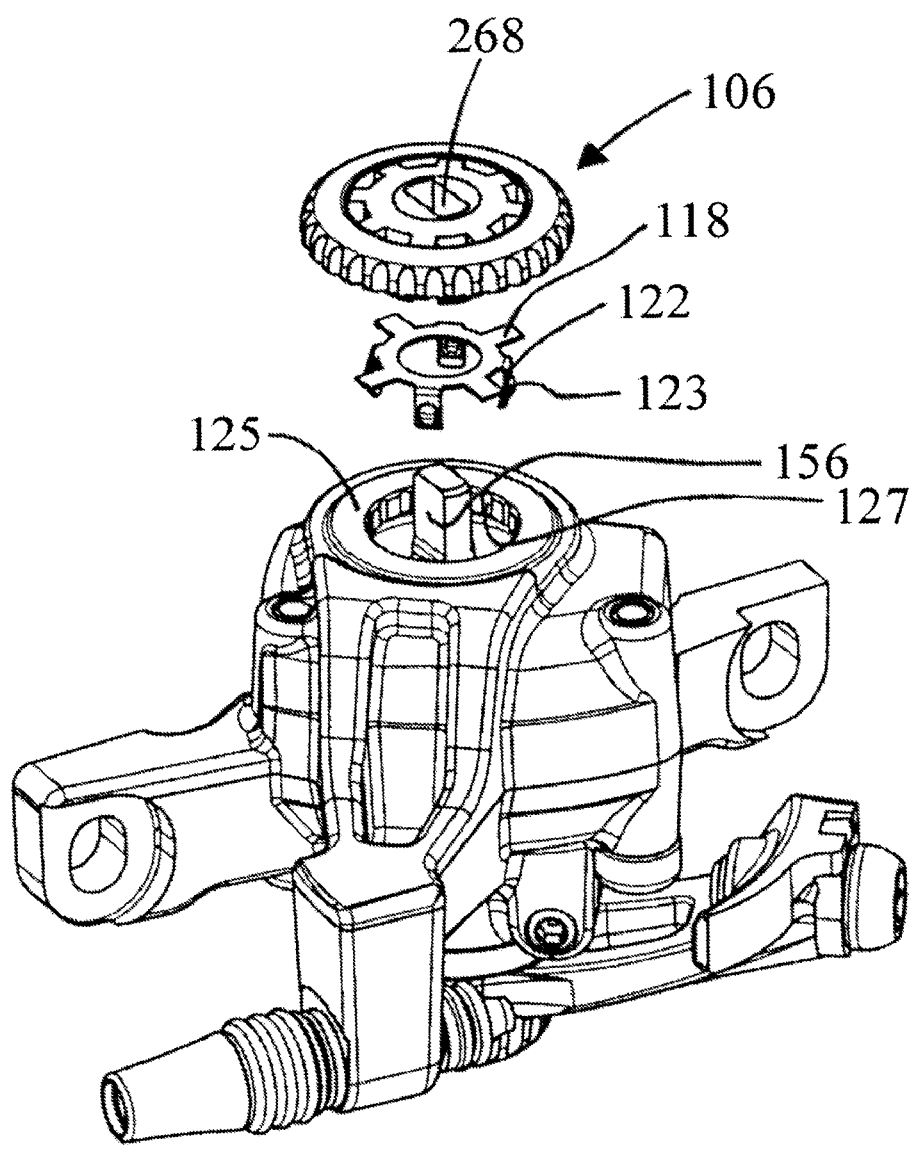
FIG. 15 is an exploded view of the inner indexing knob assembly.

An outboard knob 264 has a knurled edge 266 and an orifice or axial hole 268 sized and dimensioned to snugly receive the flats 156 of the trailing end of the foot screw 148 therein, as illustrated in FIG. 5. Referring to FIG. 4B, a plurality of axially inwardly extending legs 270 are equally circumferentially spaced in an inside surface of the outer knob 264. At the distal end of each axially inwardly extending leg 270 is an inwardly protruding barb 272. An outside indexing spring clip 274 has a plurality of axially extending bars 276 each having an inwardly extending detent 278 near its distal end. The axially extending bars 276 are sized to snugly fit between the axially inwardly extending legs 270 of the outboard knob (see FIG. 4A). With the outside indexing spring clip axially engaged with the outer knob 264 in the orientation illustrated in FIG. 4A, the outer knob 264 is axially advanced over the nut 260 and the inwardly protruding barbs 272 lockingly engage the outer diameter edge of the large outer diameter washer 256 to lock the outer knob 264 against axial movement. When attached in the this manner, the inwardly extending detents 278 of the outside indexing spring clip engage the indexing knurls 258 of the larger outer diameter washer 256. This can be best seen in detail with reference to FIGS. 14 and 5. As will be described further below, the complimentary detents and indexing knurls provide a tactile indication of pad advancement as the outboard knob 264 is rotated.

Figure 12:
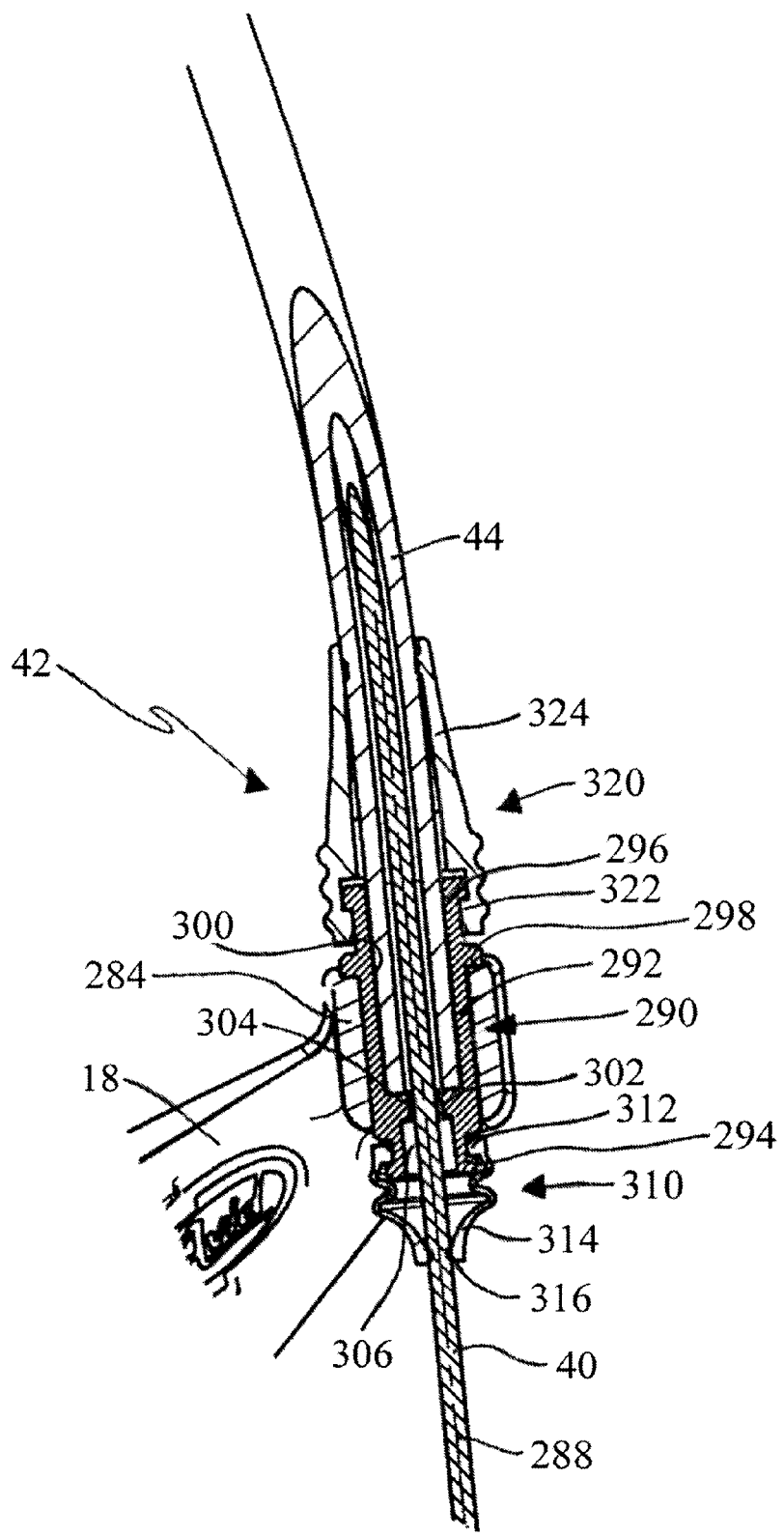
FIG. 12 is a cross-section of the cable feed taken along line 12—12 of FIG. 10.
Figure 13:
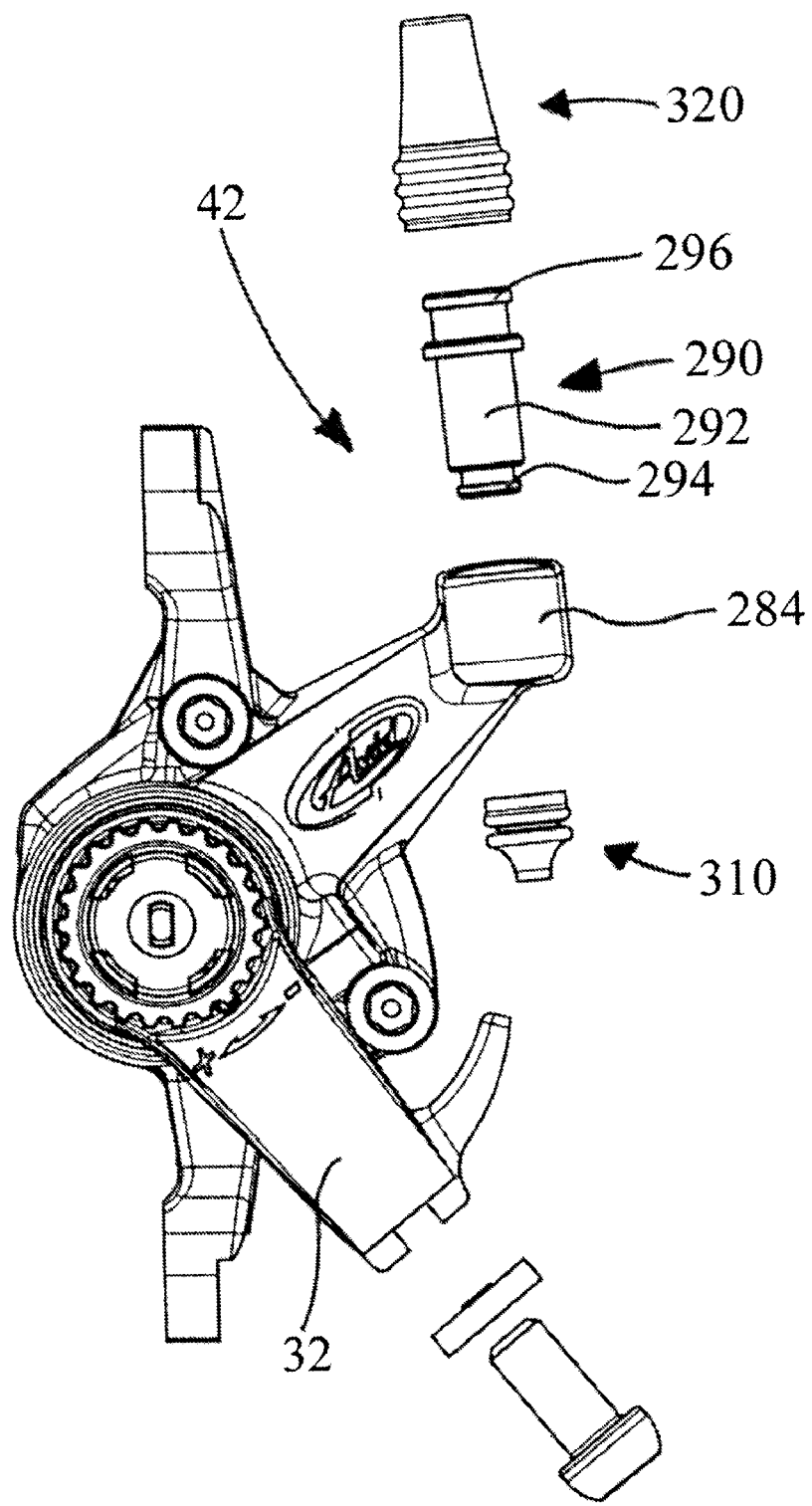
FIG. 13 is a front exploded view of the cable feed.

With reference to FIGS. 4A, 12 and 13, the cable feed 42 consists of a mount 284 which is preferably integrally cast with the housing 18. The mount 284 includes an orifice 286 centered along a guide axis 288. A cylindrical housing stop ferrule 290 has a cylindrical main body 292 having an outer diameter dimensioned to fit freely yet snugly within the orifice 286. A minor boot retention barb 294 extends axially from a leading end of the housing stop ferrule. A major boot retention barb 296 extends axially from a trailing end of the housing stop ferrule 290. An annular retention flange 298 extends radially from the main body 292 adjacent to the major boot retention barb 296 and forms a stop which halts axial insertion of the housing stop ferrule 290 into the orifice 286, as best seen in FIG. 12. Further referring to FIG. 12, the inside of the housing stop ferrule 290 has a trailing portion having an inner diameter slightly larger than that of a standard cable housing to axially receive the cable housing 44 therein. An annular flange 302 extends inwardly to define a cable guide orifice 304. The inner diameter of the minor boot retention barb 306 is of a size between that of the trailing inner diameter 300 and the cable guide orifice 304.

A hollow minor retention boot 310 is molded of an elastomeric material and at its trailing edge has an inwardly extending annular flange 312 configured to lockingly engage with the minor boot retention barb 294 of the housing stop ferrule 290. With the housing stop ferrule 290 inserted in the orifice 286 as illustrated in FIG. 12 and the minor retention boot mounted with the inwardly extending annular flange 312 engaging the minor boot retention barb 294, the housing stop ferrule is secured against removal from the orifice 286. The minor retention boot has a leading nipple 314 having a leading hole 316 with an inner diameter slightly less than the outer diameter of the standard bicycle brake cable 40. In this manner, the leading nipple forms a wipe seal with the brake cable 40 as seen in FIG. 12.

A hollow major retention boot 320 molded of an elastomeric material has an inwardly extending annular flange 322 sized to lockingly engage with the major boot retention barb 296 on the trailing end of the housing stop ferrule 290 as best viewed FIG. 12. The trailing end 324 has a tapered inner diameter, which at the extreme trailing end is slightly smaller than the outer diameter of the standard cable housing to form a sealing relationship therewith.

Figure 23:
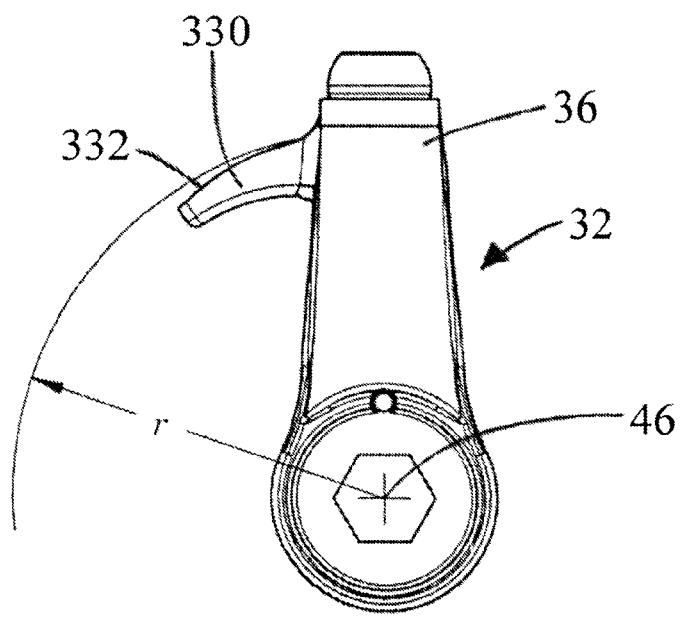
FIG. 23 is a front view of the lever arm illustrating the progressive, eccentric shape of the cable guide surface.
Figure 24:
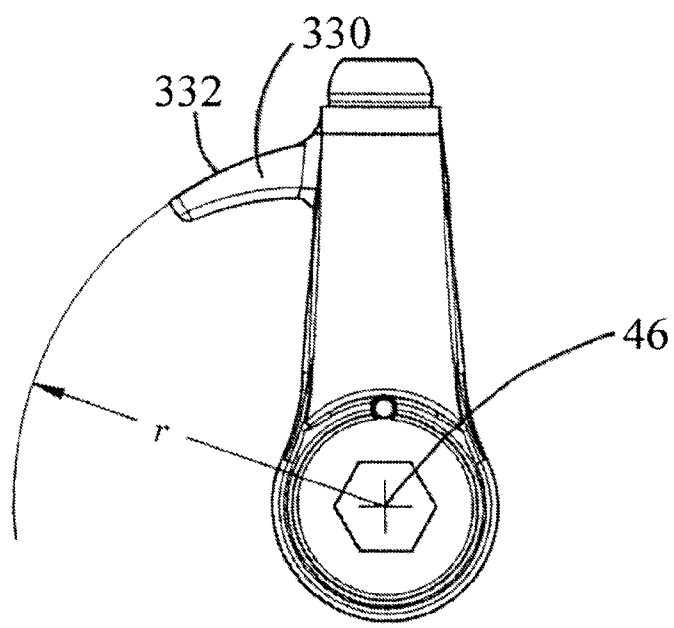
FIG. 24 is a front view of the lever arm illustrating the constant, concentric shape of the cable guide surface.

With the lever arm 32 pivotably attached to the housing as illustrated in FIGS. 1–3B, 10 and 11, a curved horn 330 defining an axially flat, circumferentially curved cable guide surface 332 extends from a trailing end of the second end 36 of the lever 32. The curved horn 330 curves about the axis of rotation 46 of the lever arm 32. In the preferred embodiment, the curved horn is eccentric about the axis as illustrated schematically in FIG. 23 to provide for progressive increase in power as the lever is actuated by a cable 40. Alternatively, the curved horn can be concentric as shown in FIG. 24 or eccentric and regressive, which though not illustrated, would require the curved horn to have an increasing radius as it extends toward its free end, essentially the opposite of the progressive horn illustrated in FIG. 23.

The cable clamp 38 consists of a screw 334 having a threaded shaft 336 sized to threadably engage an internally threaded bore in the lever arm 32 having an axis normal to the axis of rotation 46. In the preferred embodiment, a clamp plate 338 is secured between the head of the screw 334 and the second end 36 of the lever arm 32. The clamp plate has a tab 340 which is received in a notch 342 defined in the distal end of the lever arm 32 to fix the clamp plate against rotation. A groove 344 is formed in the underside of the clamp plate adjacent to the notch 342 to receive the cable 40 and has a number of protrusions 345 extending therein to improve the grip of the cable, as illustrated in FIG. 4B.

The curved horn 330 is configured so that with the ball bearing mechanical disc brake caliper installed on a bike frame as illustrated in FIGS. 1–3B, the guide axis 288 is essentially tangent to the free end of the curved horn 330. Essentially tangent means a cable 40 does not have a significant bend when it contacts the cable guide surface 332, but instead has a very gradual transition to the cable guide surface 332 as viewed in FIG. 3. When tension is applied to the cable 40 by a tension actuator such as a conventional bicycle brake lever, the lever arm 32 is drawn toward the cable feed 42. Because of the circumferentially curved cable guide surface 332, the fixed cable clamp and the fixed cable feed 42, no sharp bends are introduced to the cable 40 which might fatigue the cable and lead to premature failure of the cable, which could have disastrous results for a user.

In the embodiment illustrated in FIG. 1, the conventional cable housing extends from the trailing end of the major retention boot 320. An improvement to this conventional brake setup is to provide a floating cable stop 70 mating with the trailing inner diameter 300 of the housing stop ferrule 290 as illustrated in FIG. 3A. The floating cable stop 70 consists of a axially and radially rigid tube 348 made of a suitable material such as a metal like aluminum or stainless steel or an exceptionally rigid thermoplastic. As used herein, axially and radially rigid means the tube 348 has sufficient rigidity that it will not buckle about its lengthwise axis upon application of tension within the normal range of operating tensions applied to the cable 40 which runs within the tube 348. In the preferred embodiment, the tube 348 has a standard cylindrical cross-section (see FIG. 3C), although other cross-sections may be useful or desired. The outer diameter is preferably essentially the same to that of a standard cable housing 44 so that it can fit into a trailing end of the housing stop ferrule 290 in the same manner as the housing 44 as illustrated in FIG. 12. A connector ferrule 350 connects the tube 348 to a conventional cable housing 44. The conventional cable housing allows the cable to be axially deflected as may be required to attach the cable to a brake lever. A significant advantage of the floating cable stop 70 is that when it replaces conventional cable housings, it provides a straight path for the cable inside with minimal or no contact with the inner diameter of the tube. Over all but the shortest of lengths, the axially flexible cable housing will buckle about the lengthwise axis under application of even minor tension to the cable within and the resultant compression to the cable housing. Elimination of this buckling further reduces contact of the cable with the inner diameter of the tube and serves to further minimize friction on the cable. The floating cable stop can be deployed wherever there is a straight length of cable, independent of fixed housing stops on the bicycle frame. It also provides a protective barrier for the cable, much like conventional cable housing, but at a lesser weight.

Figures 3B, 3C:
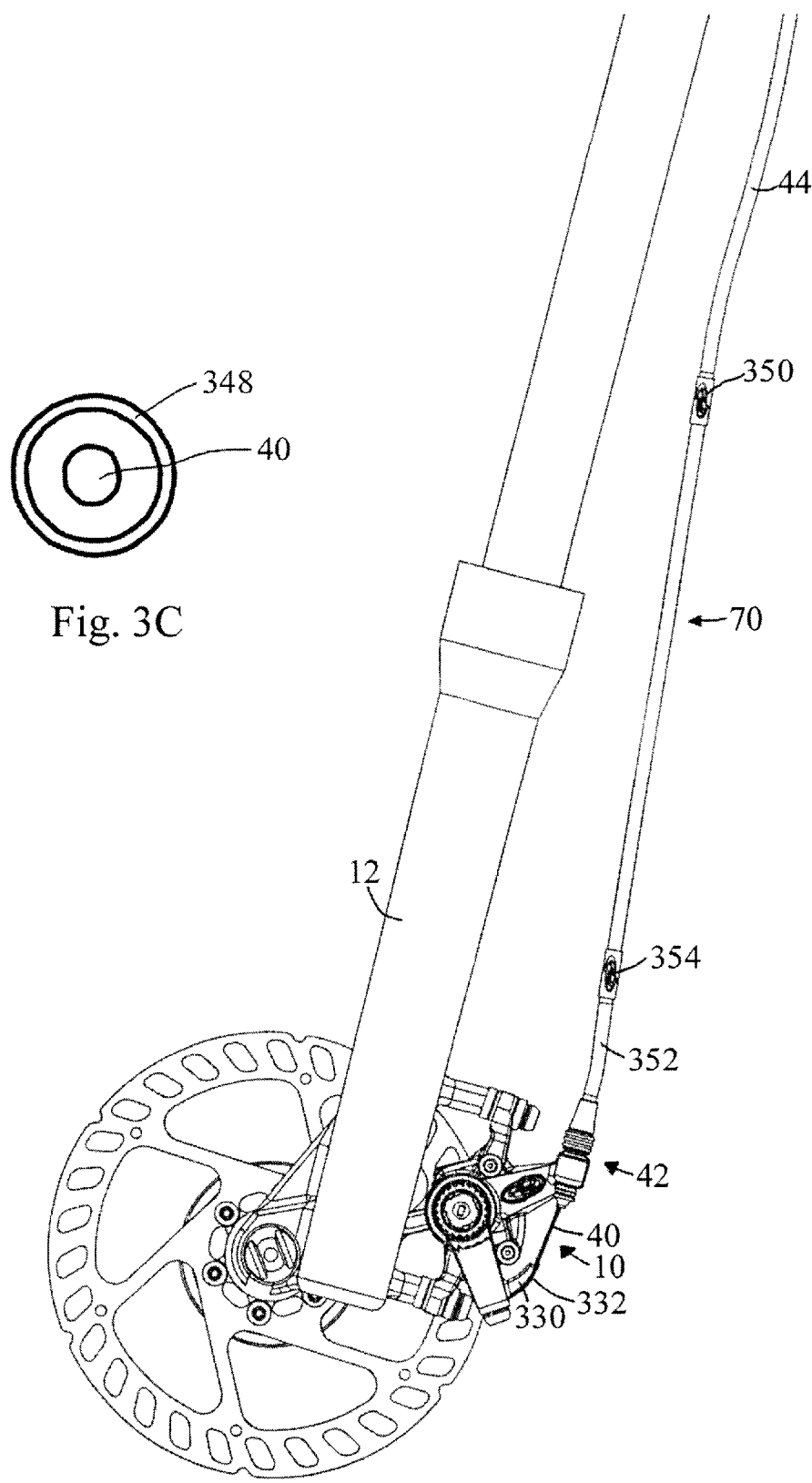
FIG. 3B is identical to FIG. 3A except it further includes an alternate embodiment of the floating cable stop.
FIG. 3C is a cross-section of the floating cable stop taken along line 3C—3C of FIG. 3A.

In a preferred embodiment illustrated in FIG. 3B, a small length of conventional housing 352 is disposed between the tube 348 and the housing stop ferrule 290 and is joined to the tube 348 by connector ferrule 354. The transition housing 352 is advantageous because it will flex in the event of a lateral blow to the tube 348 and thereby minimize the risk of bending of the tube 348 which would detract somewhat from its performance and could even result in undesired buckling of the tube 348. Preferably, the transition housing 352 is of a length that will not buckle under application of operating tensions to the cable 40 but will still provide sufficient axial flexibility to protect the tube 348. Alternatively, if required, the transition housing 352 could be long enough to bend the cable as required to properly cable to the cable feed. Or, an apparatus such as the ROLLAMAJIG, manufactured to Avid, L.L.C., of Englewood, Colo., U.S. Pat. No. 5,624,334, the disclosure of which is hereby incorporated by reference, could be substituted for the transition housing to minimize friction where a bend is required to direct the cable.

It should be apparent to those skilled in the art that floating cable stop 70 could be deployed on any cable actuated bicycle component, including cantilevered brakes, caliper brakes, side pull caliper brakes and derailuers.

Figure 16A:
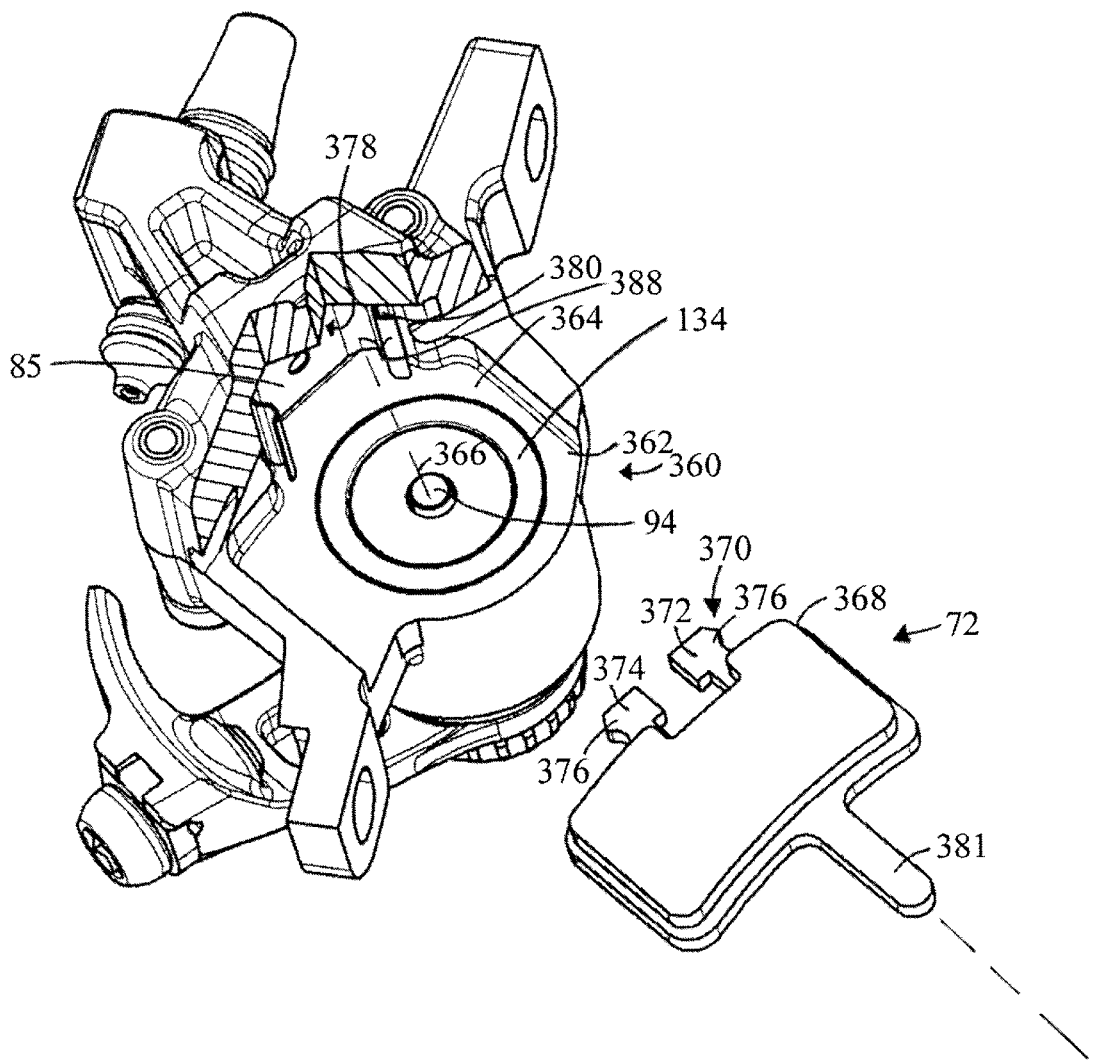
FIG. 16A is a perspective view of the ball bearing mechanical disc brake caliper with a portion of the housing cut away to reveal the pad receiving cavity.
Figure 16B:
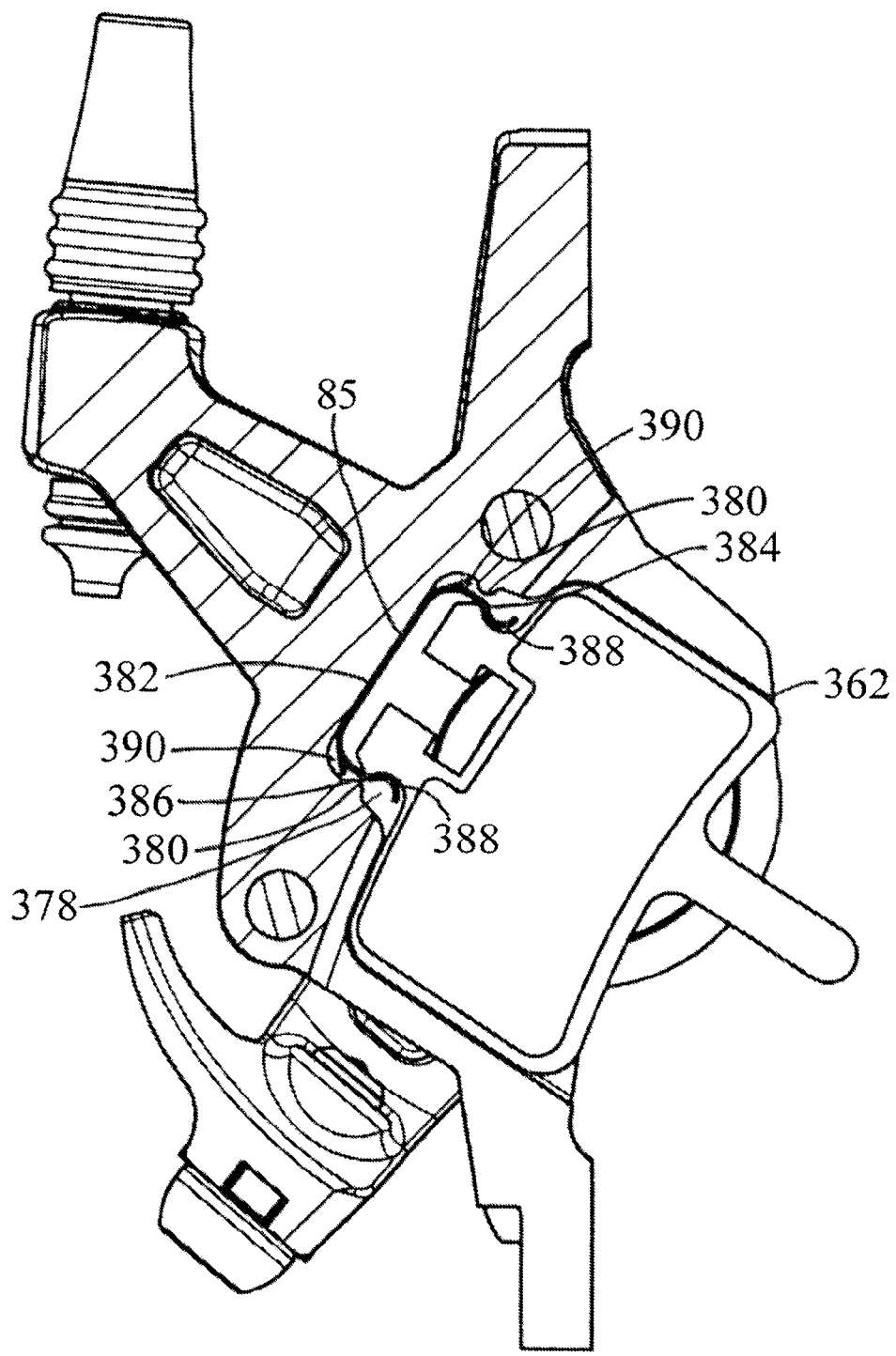
FIG. 16B is a sectional view of the ball bearing mechanical disc brake caliper taken along line 16B—16B of FIG. 10.

The first and second brake pad assemblies 72, 74 are made to be removable from the caliper housing when a disc is not operatively associated with the caliper housing between the brake pad assemblies. Referring to FIG. 16A, a retention structure for the first and second brake pad assembly 72, 74 is illustrated. The caliper housing has a cavity 360 configured to receive the disc 14. The cavity 360 has a mouth 362 at a leading end and includes a pair of opposing recesses 364 (one shown in FIG. 16A). The recesses 364 are configured to nest the backing plates 76, 78 of the brake pad assemblies 72, 74 on opposite sides of the disc so that the friction pads 84 can be brought into and out of engagement with the disc by an actuating or drive apparatus along an advancement axis 366 in a manner that will be described in greater detail below. At a leading end 368 of pad assembly 72 is a retention tab 370 formed from a pair of extending posts 372, 374 having oppositely extending protrusions 376. Referring to FIG. 16B, within the cavity 360 opposite the mouth 362 is a retention clip cavity 378 opening into the cavity 360. Engagement flanges 380 extend from opposite sidewalls of the retention clip cavity. Pad retention clip 85 is shown in FIG. 16A installed within the retention clip cavity 378. The pad retention clip 85 has a base 382 with a pair of extending sidewalls or legs 384, 386 with a retention detent 388 near the far end of each leg protruding inwardly. Near the base 282 a plurality of retention barbs 390 extend laterally from the sidewalls or legs 384, 386. As illustrated in FIG. 16B, these retention barbs 390 are configured to snap fit with the engagement flanges 380 to lock the pad retention clip 85 within the retention clip cavity 378.

Figure 17A:
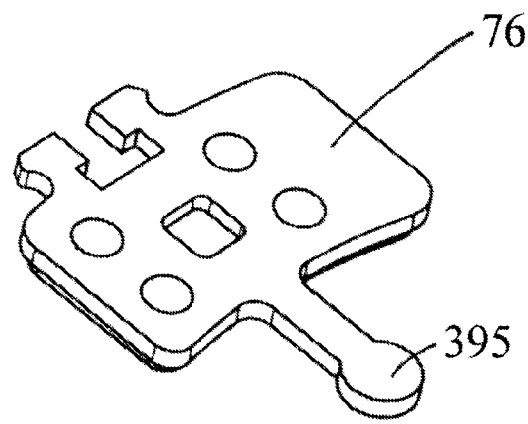
FIGS. 17A, 17B and 17C are alternate embodiments of the backing plates of the brake pad assemblies.
Figure 17B:
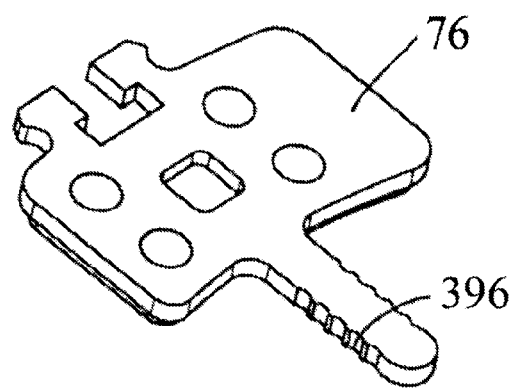
Figure 17C:
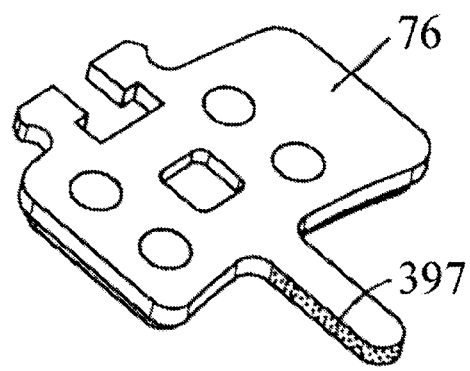
Figure 18:
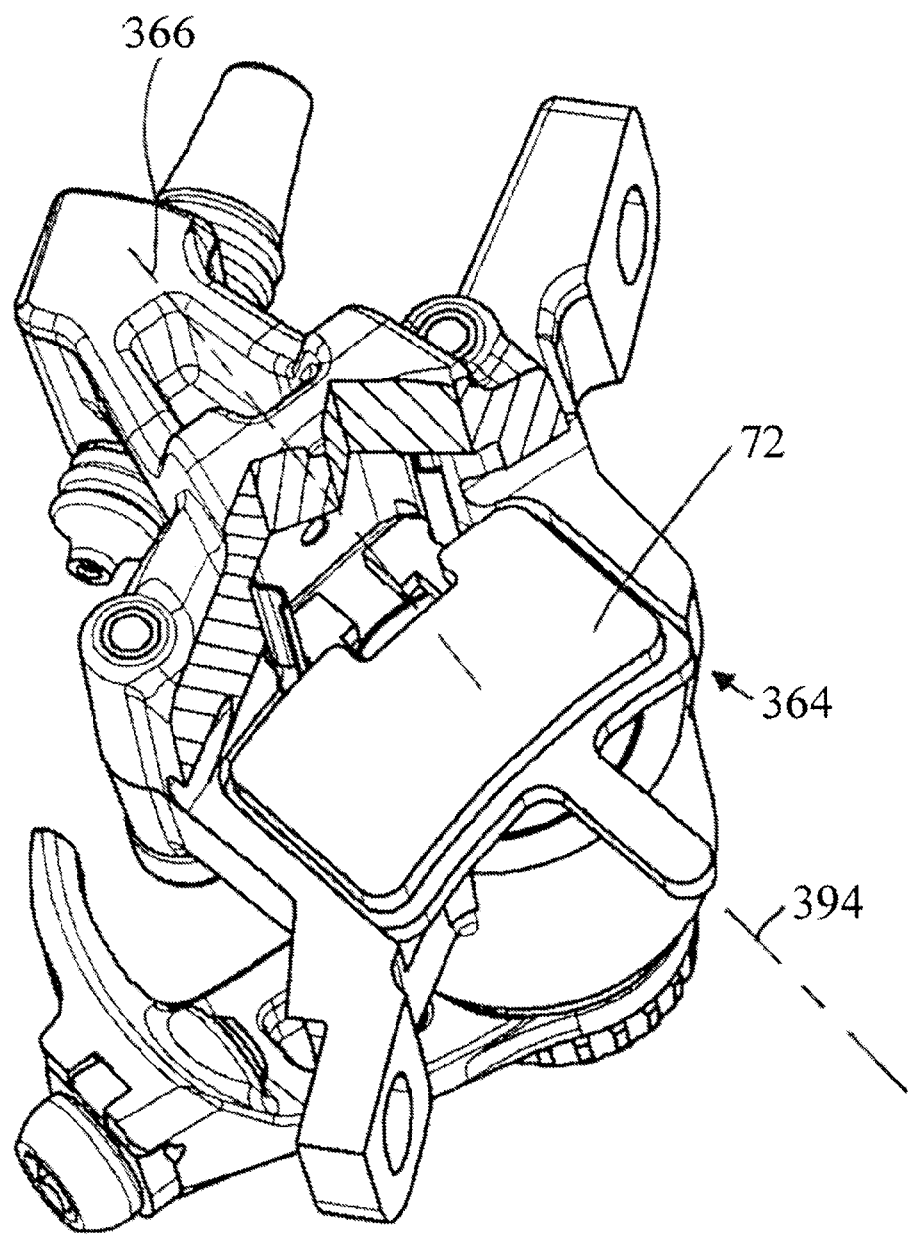
FIG. 18 is identical to FIG. 16, only showing the pad assembly installed with the pad assembly recess.

Referring back to FIG. 16A, the pad assembly 72 is installed by grasping the handle 392 and advancing the leading edge 368 into the mouth 362 along the engagement axis 394 and aligning the retention tab 370 with the pad retention clip 85 and further advancing the pad assembly so that the protrusions 370 mate within the retention detents 388. The pad can then be slid into the recess 364 along the advancement axis 366 to seat the pad assembly within the recess 364, as viewed in FIG. 18. When seated in this manner, the walls of the recess 364 secure the pad assembly against movement transverse the advancement axis 366 as a rotating disc is engaged. As best viewed in FIG. 5, it should be appreciated that the axial post 94 of the respective inboard or outside pressure foot 86, 134 is received within the receptacle 81 and the trailing surface 80 of the backing plates to thereby prevent withdrawal of the pad assembly from the mouth 362 of the cavity 360 with the brake pad seated as illustrated in FIG. 18. This connection is also the primary support against withdrawal along the engagement axis as the pad assembly is advanced and withdrawn by the actuation mechanism. The magnet 88 or 88' holds the backing plate in abutment with the respective pressure foot 86, 134 to maintain engagement between the axial post 94 and the receptacle 81. As the brake pads are advanced along the advancement axis, the cooperating engagement flanges 380 of the pad retention clip and the protrusions 376 of the pad retention tab define a rail facilitating movement forward and backward along the advancement axis. The pad clips can be easily removed from the orifice simply by manually advancing them inward along the advancement axis to bring the receptacle 81 out of engagement with the axial post 94 whereupon the engagement flanges 380 can be snapped out of engagement with the protrusions 376. As shown in FIGS. 16A and 16B, the handle 392 has straight edges. To facilitate gripping, the handle may be modified as shown in FIGS. 17A–C. In FIG. 17A, the handle has a distal enlargement 395. In FIG. 17B, the handle has grooves 396. In FIG. 17C, the handle has knurls or bumps 397. Other grip enhancing structures will also be apparent to those skilled in the art.

The operation of the ball bearing mechanical disc brake caliper 10 drive mechanism is best understood with reference to FIGS. 1, 5, 6, and 7. Upon actuation of the lever arm 32 by tension applied to the cable 40, the lever arm rotates about the pivot axis 46 in the direction of arrow 48. This in turn causes rotation of the drive cam 158 about this same axis. As the drive cam 158 is rotated, the ball bearings 176 cause the drive cam to advance within the outside cylinder 128 which in turn advances the foot screw 148 which is threadably engaged with the drive cam. The leading surface 150 of the foot screw 148 in turn advances the ball bearing 146 and the outside pressure foot 134 to urge the pad 84 of the outside brake pad assembly 72 into contact with the disc. Further advancement will deflect the disc 14 into contact with pad 84 of the outside brake pad assembly 74, as illustrated in FIG. 7. Upon release of the tension in the cable, the lever arm is biased back to its at rest position by the return spring 228 and the pads are retracted out of contact with the disc to reassume the position illustrated in FIG. 5.

Figure 11:
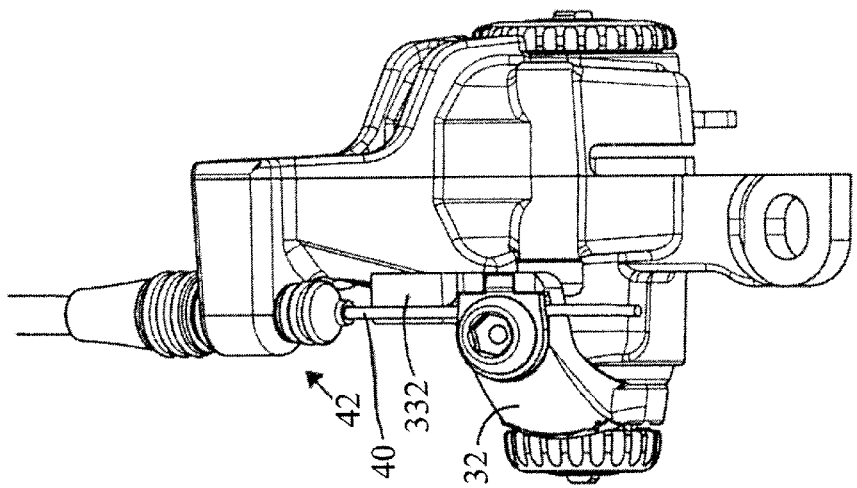
FIG. 11 is a right side elevation view of the ball bearing mechanical disc brake caliper with the lever arm actuated to the braking position.
Figure 10:
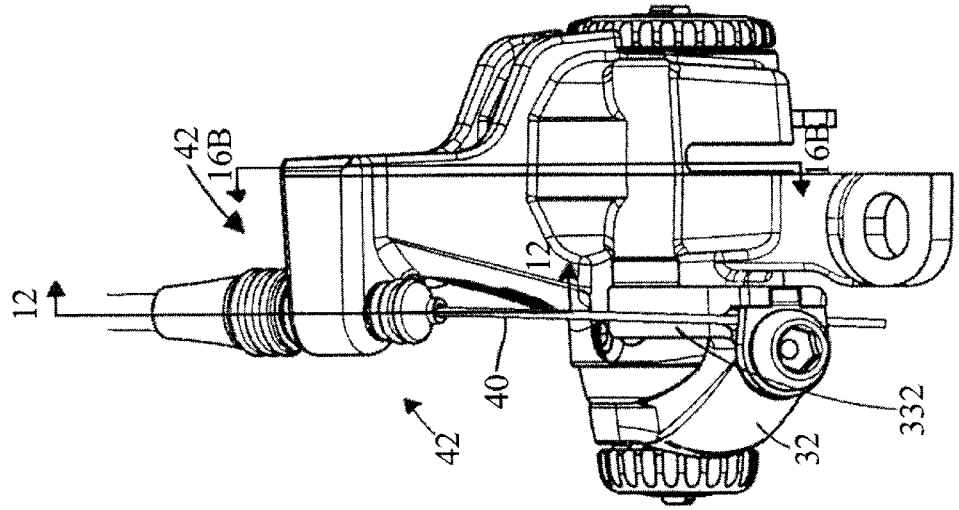
FIG. 10 is a right side view of the ball bearing mechanical disc brake caliper with the lever arm in an at rest position.

FIG. 10 illustrates that with the lever arm 32 in an at rest position, the cable extends between the cable clamp 38 and the cable feed 42 at a slight angle. With the lever arm 32 rotated about the pivot axis in the direction of arrow 48 so as to bring the pads into engagement with the disc, the lever arm advances axially along the advancement axis with the outer brake pad assembly 72 so that this slight angle is eliminated, as seen in FIG. 11. Thus, it is desirable that the axially flat, circumferentially curved cable guide surface 332 be wide enough in the axial direction to accommodate the axial movement of the lever arm 32.

As the pads wear, it may be necessary or desirable to advance the pressure feet within the inboard and outboard cylinders to maintain the original spacing between the pads and the disc. The present invention provides a pad wear compensating apparatus that allows for such advancement (or retraction) by rotary to linear linkages between the knobs 106, 264 and the respective pressure feet 86, 134 and associated pads.

Figure 6:
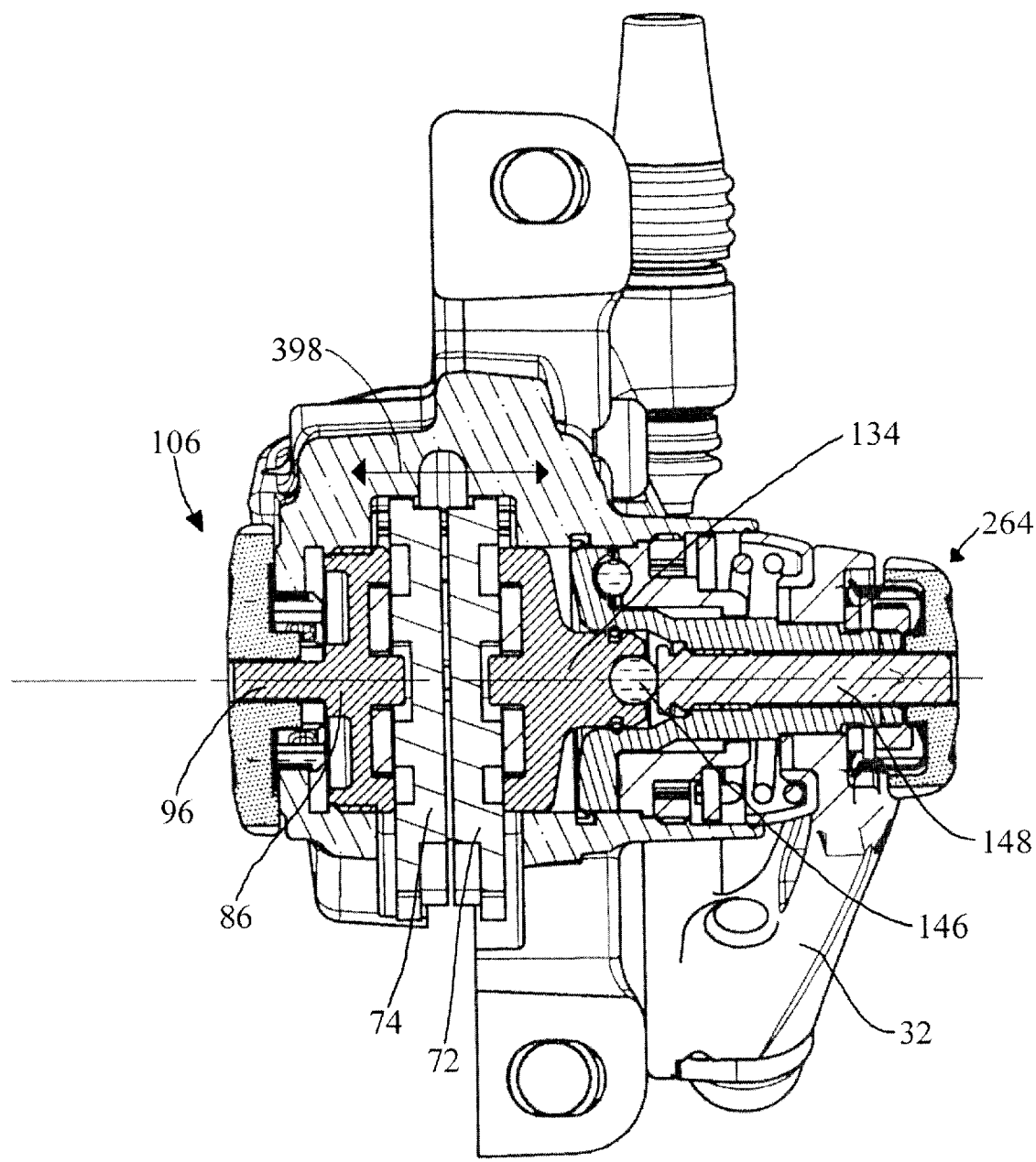
FIG. 6 is the same as FIG. 5 only with the brake pads extended using the pad wear compensation apparatus.

As described above, the pad wear compensator includes inboard pressure foot or inboard indicator 86 which is threadably engaged with the sidewall of the inside cylinder. Rotation of the inner knob 106 in a clockwise direction advances the pressure foot within the cylinder and therefore the pad assembly along the advancement axis as illustrated in FIG. 6. As the pressure foot is advanced, the trailing end or indicator dog 96 received in the axial hole 110 of the inside knob 106 advances, to provide both a visual and tactile indication of the amount the pressure foot has advanced within the inside cylinder. In addition, the radially outwardly extending detents 124 of the inside indexing spring clip 116 engage with equally circumferentially spaced knurls 126 in the inner diameter of the flange 125 to provide a tactile indication of movement of the knob. The knurls 126 and radially outwardly extending detents 124 are spaced so that each engagement between the detents and sockets indicates a uniform linear distance of advancement of the pad toward the disc. For example, in the preferred embodiment, each tactile click equates to $\frac{1}{16}$ of a full rotation and $\frac{1}{16}$ of a millimeter of pad advancement. The inboard pad assembly is retracted by rotating the inside knob counterclockwise.

The outboard pad wear compensation apparatus 153 relies on a similar rotary to linear linkage as the inboard pad compensator 73, but it is slightly more complicated. Rotation of the outside knob 264 in a clockwise direction in turn causes rotation of the indicator foot screw 148 in a clockwise direction. This rotation threadably advances the indicator foot screw 148 relative to the drive cam 158 which in turn advances the ball bearing 146, the outside pressure foot 134 and the corresponding first brake pad assembly 72. The outside pressure foot in its advanced position is illustrated in FIG. 6. It should be noted that the split washer 141 received in the annular groove 140 causes friction between the outside pressure foot and the fixed cam to prevent the outside pressure foot from simply sliding out of the outside cylinder. As with the inside knob, the outside knob also provides a tactile indication of rotation corresponding to a select linear advancement. This is provided by the inwardly extending detents 278, which engage with the indexing knurls 258 of the larger outer diameter washer 256. In addition, as described above, advancement of the indicator foot screw 148 and therefore the outside pressure foot 134 can be monitored visually and by feel by noting how far the trailing end 156 of the indicator foot screw 148 advances relative to the outer surface of the outer knob 264 within the axial hole 268. To retract the pad, the outside knob is rotated counter-clockwise to retract the indicator foot screw 148 and the drive mechanism is actuated to squeeze the disc, which in turn retracts the outside pad assembly 72 and the outside pressure foot 134 by forcing them into abutment with the retracted foot screw 148.

The pad wear compensating apparatus not only allows for convenient advancement of the brake pad assemblies as the brake pads wear, but the structure also provides a quick and convenient way to properly align the caliper housing 18 relative to a disc 14. This can be done by loosening the mounting bolts 28 and then advancing the pad assemblies into contact with the disc using the inboard and outboard pad wear compensators 73, 153. With the disc squeezed between the pads, the mounting structure including the slotted mounting feet 20, 22 and the concave and convex washers 30 enables precise alignment of the caliper housing to maintain the leading pad surfaces parallel to the disc. Tightening the mounting bolts 28, 30 then secures the precise alignment. For example, because the inner pad assembly is stationary, it is generally preferred to provide a very small clearance between the inner pad and the disc and a greater clearance between the moveable outer pad and the disc. This set up can be achieved by starting with the pads fully withdrawn along the advancement axis into the cavity 360 as shown in FIG. 5 and then advancing the inner pad assembly using the inner knob a short distance while advancing the pad associated with the outer knob a greater distance into contact with the disc. The mounting bolts are then tightened and the knobs are turned to retract the pad assemblies to provide a desired operative gap with the disc.

While this greatly simplifies the process of properly aligning the caliper housing and brake pads during initial set up, the pad advancement structure in combination with the caliper housing mounting system also provide for simplified field repair. For example, if a user crashes and one of the attachment bosses is bent, the user can detach the mounting bolts 28, bend the bent attachment boss back in position as well as possible by eye-balling it and then reposition the caliper housing with the brake pads properly aligned parallel to the disc simply by repeating the procedure described in the preceding paragraph.

In operation, as the brake pads are caused to compress the disc therebetween, a high tensile force is applied to the housing in the vicinity of the inside and outside cylinders. This can put tremendous stress on the housing, and can even cause the housing to split apart. This problem is all the more acute where the housing is cast from a lightweight, relatively low tensile strength metal such as aluminum. To address this problem, the ball bearing mechanical disc brake housing has a pair of threaded bores 400, 402, which extend the width of the housing on opposite sides of the pivot axis 46. A steel screw 404 threadably engages each threaded bore 400, 402 and is tightened to pre-stress or pretension the caliper housing. The screws are preferably tightened to apply a compression force of about 1,000–1,400 lbs. This not only prevents cracking and failure of the housing, it virtually eliminates any flexure of the housing that could dissipate braking power or fatigue the housing.

Figure 9:
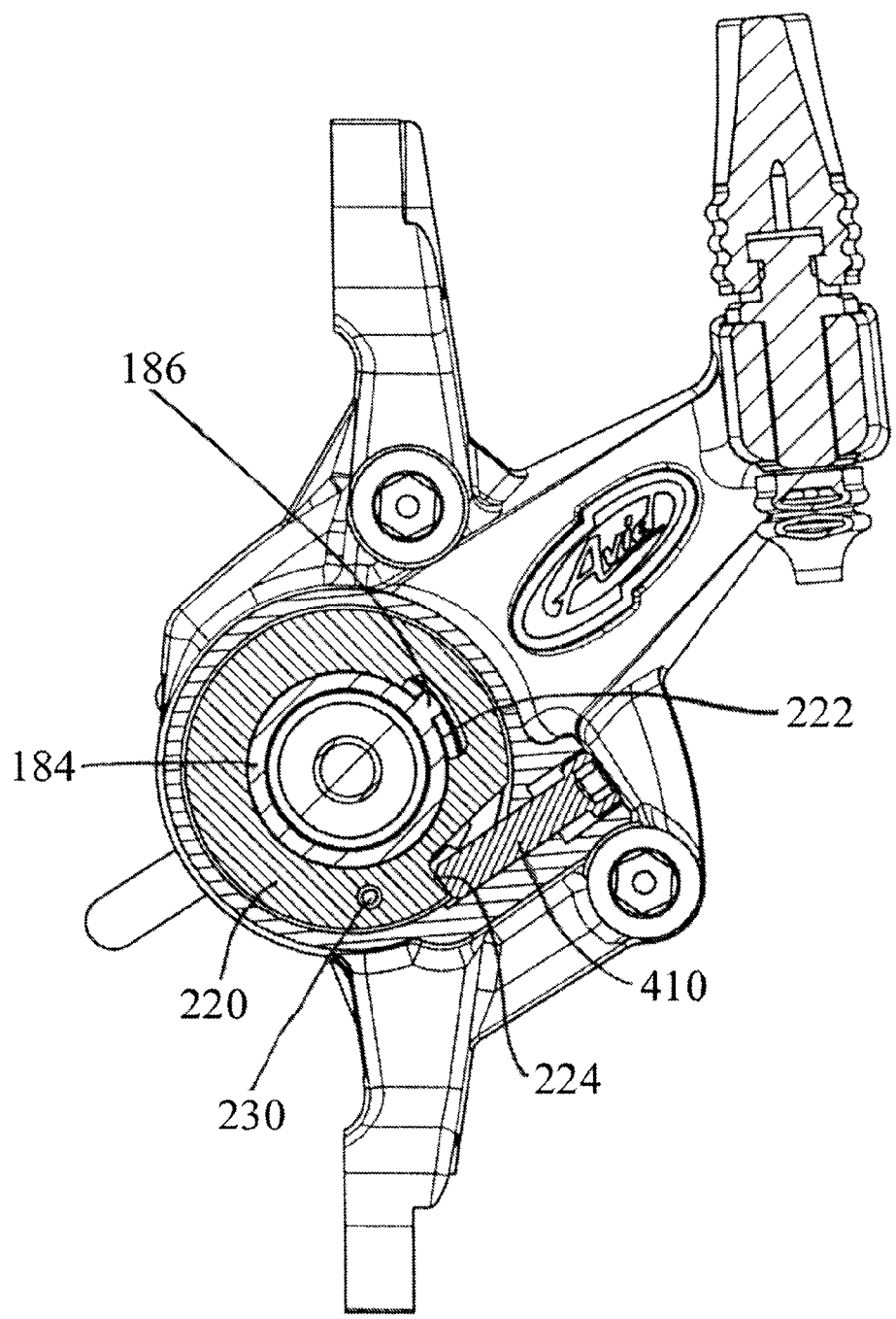
FIG. 9 is a cross-section of the ball bearing mechanical disc brake caliper taken along line 9—9 of FIG. 8.

The ball bearing mechanical disc brake caliper 10 also includes a mechanism for adjusting the return force on the lever arm 32 applied by the return spring 228. Referring to FIG. 9, adjustment screw 410 is threadably received in a threaded bore 412 in the housing which breaches the outer cylinder with the axis of the bore 412 aligned with the stop surface 224 of the spring tension biasing plate 220. As the adjustment screw 410 is advanced within the treaded bore 412, the spring tension biasing plate 220 rotates about the cylindrical body 180 of the fixed cam 178 to increase the tension on the spring. Turning the adjustment screw 410 to retract it from the bore causes rotation of the spring tension biasing plate 220 which decreases the tension on the spring 228. As seen in FIG. 9, the spring tension limiting slot 222 cooperates with the spring tension limiting boss 186 of the fixed cam 178 to limit rotation of the spring tension biasing plate 220 and therefore the range of return force applied to the lever arm 32.

Figure 25:
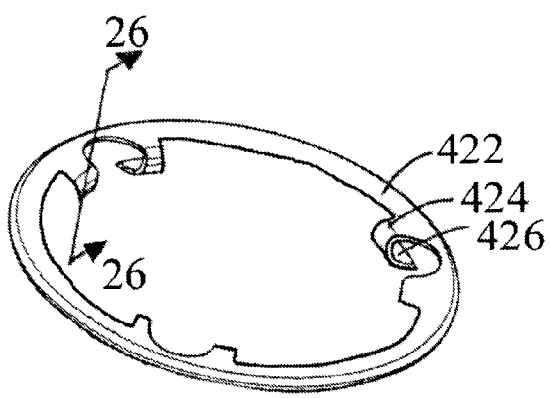
FIG. 25 is a perspective view of a ball retainer.
Figure 27:
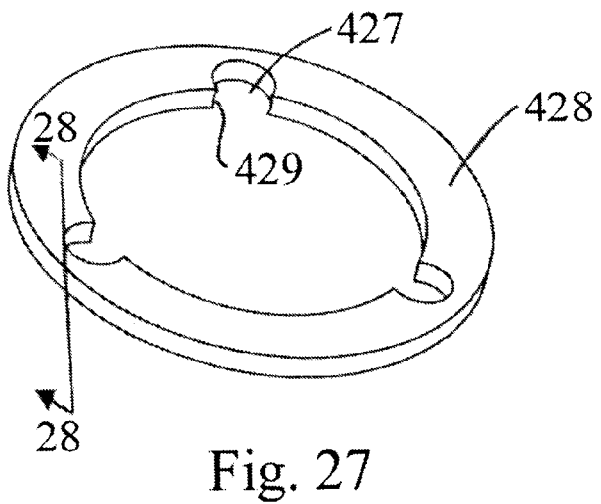
FIG. 27 is a perspective view of an alternate embodiment of a ball retainer.
Figure 26:
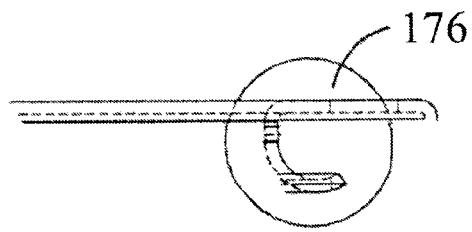
FIG. 26 is a sectional view of a ball retainer taken along line 26—26 of FIG. 25 with a ball engaged therein.
Figure 28:
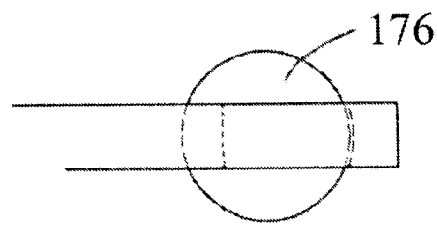
FIG. 28 is a sectional view taken along line 28—28 of FIG. 27 with a ball engaged by the retainer.

It may be useful or desirable to provide a ball spacer between the drive cam 158 and the fixed cam 178 to maintain the ball bearings 176 equally spaced within the elongated ramped grooves 162, 200. If such a ball spacer is to be used, one embodiment of a design for such a ball spacer is illustrated in FIGS. 25 and 26. The ball spacer 420 could be made of a simple sheet metal stamping consisting of a ring body 422 with inwardly extending radial leg pairs 424 spaced to correspond to the desired spacing of the ball bearings. The radial legs 424 can be curled as illustrated in FIG. 25 to define a ball receiving socket 426. The legs 424 of each pair are circumferentially spaced so that a ball bearing 176 can be snap fit therebetween as illustrated in FIG. 26. FIGS. 27 and 28 depict another embodiment of a ball spacer molded of plastic. Notches 427 in a ring 428 are sized to snap fit with the ball bearings 176. The ring is thick enough and the insides of the notch are slightly concave (see 429 in FIG. 27) to secure the ball bearing about an axis as illustrated in FIG. 28. Either ball spacer embodiment secures the ball bearings 176 about an axis and thus ensures that the ball bearings 176 will maintain an equal radial spacing and further ensures that the ball bearings will be the same distance between the face of the drive cam and the fixed cam.

Figure 29:
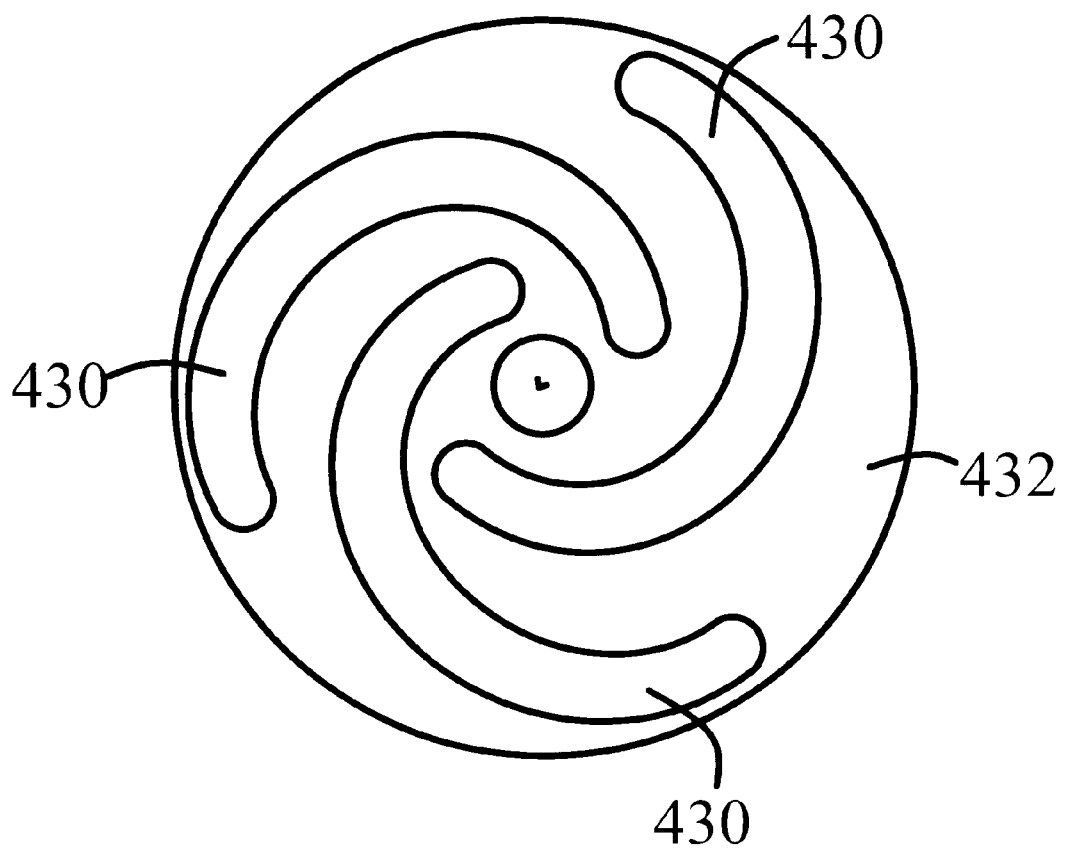
FIG. 29 is a plan view of an alternate embodiment of ramped grooves in a fixed cam.

The ramped groove structure of the fixed cam and drive cam illustrated in FIGS. 4A and 4B is useful for most applications, but it limits the amount the lever arm can be rotated to, at most, slightly under 120°. An alternate ramp structure is depicted in FIG. 29. As illustrated in FIG. 29, the ramps 430 spiral inward as they ramp upward toward the leading surface 432. With such corresponding structures provided in the leading surface of the fixed cam and the drive cam, the ramped grooves 430 can be much greater in length and have a much more gradual incline. This will enable the associated lever arm 32 to rotate much greater than 120° and for the inboard brake pad to be advanced linearly at a slower rate as the lever arm 32 is pivoted.

Figure 19:
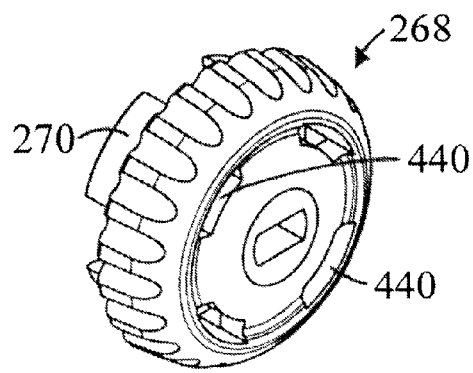
FIG. 19 is a perspective view of the outer knob.
Figure 21:
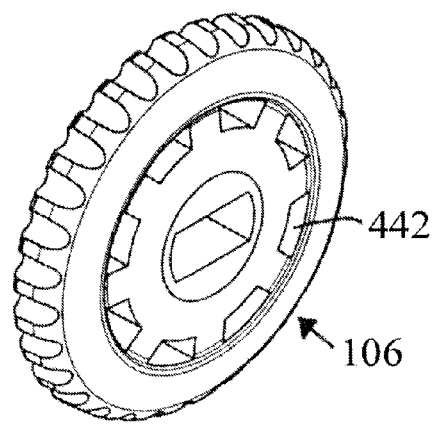
FIG. 21 is a perspective view of the inner knob.
Figure 20:
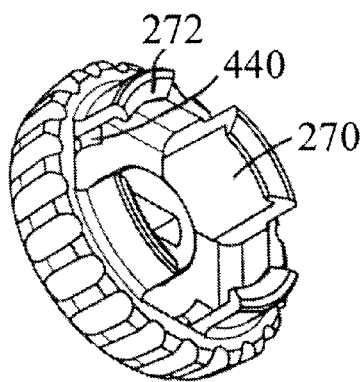
FIG. 20 is a perspective view of the outer knob from a perspective rotated 180° from that of FIG. 19.
Figure 22:
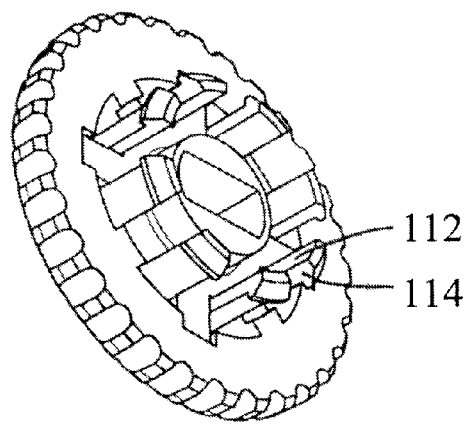
FIG. 22 is a perspective view of the inner knob taken from a perspective rotated 180° from that of FIG. 21.

The outer knob is shown in a perspective view in FIG. 19. The outer knob has an elongate slot 440 corresponding to each axially inwardly extending leg 270. Referring to FIG. 20, each elongate slot 440 overlies a corresponding barb 272. The holes 440 are formed during molding of the outer knob 264 by a mandrel which occupies the space that defines the hole 440, with the distal end of the mandrel contributing to the forming of the undercut of the barb. In this manner, the undercuts are introduced to the knob while still enabling the knob to be injection molded in a single step. Referring to FIGS. 21 and 22, the inner knob 106 likewise has elongate slots 442 corresponding to each inward axially extending leg 112. As with the outer knob described above, the slots overly the barbs 114 and enable formation of the undercut on the barbs by means of mandrels as described above with regard to the inner knob.

What is claimed is:

1. A retaining structure for a friction pad and plate assembly of a caliper of a disc brake assembly, the caliper having a housing with a cavity configured to receive a disc of the disc brake assembly, the cavity including opposing recesses configured to nest first and second friction pad and plate assemblies on opposite sides of the disc, with the caliper having a drive within the housing advancing the pad of the first friction pad and plate assembly into contact with the disc along an advancement axis, the retaining structure comprising:

a pad retention clip attached to the housing within the cavity, the pad retention clip defining and elongate track extending along the advancement axis; and a retention tab on a plate of the first friction pad and plate assembly, the retention tab being configured to snap fit with the pad retention clip and to move along the advancement axis within the elongate track as the first friction pad and plate assembly is advanced along the advancement axis by the caliper drive.

2. The retaining structure of claim 1 wherein the pad retention clip comprises base with a pair of legs extending therefrom with the base attached to the housing within the cavity opposite the mouth, the far ends of the legs opening toward the mouth, there being a retainer near the far end of each leg protruding inwardly and the retention tab is on a leading edge of the plate of the first friction pad plate assembly and the retention tab comprises oppositely extending protrusions sized to be snap fit between the retainers of the pad retention clip, the friction pad and plate assembly being retained in the retention clip by advancing the pad and plate assembly along an engagement axis toward the pad retention clip and snap fitting the oppositely extending protrusions between the retainers.

3. The retaining structure of claim 1 wherein the retention clip extends along the advancement axis substantially the same distance as the cavity mouth and each plate of the first and second friction pad and plate assemblies has a retention tab, whereby both the the first and second friction pad and plate assemblies has a retention tab, whereby both the first and second pad and plate assemblies are snap fit into the same retention clip on opposite sides of the disc.

4. The retaining structure of claim 1 wherein the retention clip and the retention tab are configured to releasably retain the first friction pad and plate assembly within the cavity.

5. The retaining structure of claim 4 wherein the caliper drive includes a pressure foot abutting a back side of the plate of the first pad and plate assembly opposite the pad, there being a keyed engagement structure between the pressure foot and the back side of the plate, the keyed engagement structure being brought into engagement by advancing the pad and plate assembly toward the pressure foot along the advancement axis with the keyed engagement structure, when engaged, preventing release of the pad and plate assembly from the pad retention clip by movement of the pad and plate assembly transverse the advancement axis.

6. The retaining structure of claim 5 wherein the plate of the pad and plate assembly is made of a ferrous metal and the pressure foot comprises a magnet to releasably attach the plate to the pressure foot.

7. The retaining structure of claim 2 wherein the far ends of the legs of the retention clip are resiliently biased toward one another to releasably retain the friction pad and plate assembly.

8. The retaining structure of claim 2 wherein the caliper housing comprises a clip receptacle opening to the cavity opposite the mouth of the cavity, the pad retention clip being nested in the clip receptacle.

9. The retaining structure of claim 8 further comprising a pair of flanges extending toward one another into the clip receptacle near a mouth of the clip receptacle, the pad retention clip having barbs oppositely extending from the base near the legs, the barbs being configured to snap fit with the flanges when the pad retention clip is advanced into the clip receptacle along the engagement axis.

10. The retaining structure of claim 2 wherein the pad retention structure further comprises the opposing recesses configured to nest the pair of friction pad plates of the friction pad plate assemblies having a pair of sidewalls extending from the mouth parallel to the advancement axis, the plate of the friction pad plate assembly having corresponding sidewalls abutting therewith to substantially prevent movement of the pad plates within the recess except along the advancement axis and the engagement axis.

11. A backing plate of a pad and plate assembly for use with a caliper of a disc brake assembly, the caliper having a housing with a cavity configured to receive a disc of the disc brake assembly, the cavity having a mouth at a leading end, the cavity including a pair of opposing recesses configured to nest a pair of backing plates on opposite sides of the disc with the caliper having a drive advancing the friction pad of at least one of the pad and plate assemblies into contact with the rotor along an advancement axis, the cavity further having a pad retention clip attached to the housing within the cavity opposite the mouth, the pad retention clip having a pair of retaining legs opening toward the mouth, the backing plate comprising:

a body having a leading edge and a trailing edge disposed along an advancement axis, there being a retention tab on the leading edge of the body having oppositely extending protrusions dimensioned to be snap fit between the retaining legs of the pad retention clip by advancing the body along the engagement axis and engaging the pad retention clip with the retention tab.

12. The backing plate of claim 11 further comprising the backing plate having opposing side edges extending between the leading and the trailing edges, the opposing side edges mating with corresponding side walls of the cavity recesses to enable sliding movement of the backing plate along the advancement axis within the cavity.

13. The backing plate of claim 11 further comprising an elongate handle extending along the engagement axis from the trailing edge of the body.

14. The backing plate of claim 13 further comprising means for enhancing gripping of the handle attached to the handle.

15. The backing plate of claim 11 wherein the drive comprises pressure foot abutting the backing plate, the pressure foot having a post extending along the advancement axis, the backing plate further comprising a leading surface and a trailing surface, the trailing surface having a receptacle for receiving the post.

16. A method of releasably attaching a friction pad and plate assembly to a caliper of a disc brake assembly, the caliper having a housing with a cavity configured to receive a disc of the disc brake assembly, the cavity having a mouth at a leading end for receiving a first and a second pad and plate assembly on opposite sides of a disc received therein, the caliper having a drive within the housing advancing the pad of the first friction pad and plate assembly into contact with the disc along an advancement axis, the method comprising:

providing a releasable snap fitting between the plate of the first friction pad and plate assembly and a wall of the caliper housing cavity, the releasable snap fitting, when engaged, permitting movement of the pad and plate assembly along the advancement axis and resisting movement of the pad and plate assembly along an engagement axis transverse the advancement axis;

providing a keyed fitting aligned along the advancement axis between a back side of the plate opposite the pad of the pad and plate assembly and a pressure foot associated with the caliper drive, the keyed fitting, when engaged, preventing movement of the pad and plate assembly along the engagement axis;

advancing the friction pad and plate assembly within the cavity along the engagement axis to engage the releasable snap fitting between the plate of the friction pad and plate assembly and the wall of the caliper housing; and advancing the friction pad and plate assembly within the cavity along the advancement axis to engage the keyed fitting.

\* \* \* \* \*